(12) United States Patent
Lehmann et al.

(10) Patent No.: US 7,857,557 B2
(45) Date of Patent: Dec. 28, 2010

(54) COMBINATION TOOL AND METHOD FOR METAL-CUTTING MACHINING OF A DRILL-HOLE AND ITS HOLE SURFACE AS WELL AS CUTTING INSERT FOR SUCH A COMBINATION TOOL

(75) Inventors: Thomas Christian Lehmann, Bamberg (DE); Günter Alfred Ebert, Ansbach (DE)

(73) Assignee: Kennametal Inc., Latrobe, PA (US)

( * ) Notice: Subject to any disclaimer, the term of this patent is extended or adjusted under 35 U.S.C. 154(b) by 308 days.

(21) Appl. No.: 12/184,676

(22) Filed: Aug. 1, 2008

(65) Prior Publication Data

US 2009/0080984 A1   Mar. 26, 2009

Related U.S. Application Data

(63) Continuation-in-part of application No. PCT/EP2007/000857, filed on Feb. 1, 2007.

(30) Foreign Application Priority Data

Feb. 3, 2006   (DE) ........................ 10 2006 005 379

(51) Int. Cl.
*B26D 1/00*   (2006.01)
*B23B 41/00*   (2006.01)
(52) U.S. Cl. ........................ 408/153; 407/36; 407/113; 407/119
(58) Field of Classification Search .................. 407/66, 407/79, 46, 47, 36, 45; 408/153, 83.5, 179, 408/713; 29/50
See application file for complete search history.

(56) References Cited

U.S. PATENT DOCUMENTS

| | | | |
|---|---|---|---|
| 2,946,245 A | 7/1960 | Yogus et al. | |
| 3,371,394 A | 3/1968 | Dupuis | |
| 6,739,807 B2 * | 5/2004 | Robinson et al. | 407/50 |
| 7,131,794 B2 * | 11/2006 | Robinson et al. | 407/50 |
| 7,220,086 B2 * | 5/2007 | Killinger et al. | 408/83.5 |
| 7,311,477 B2 * | 12/2007 | Hecht et al. | 407/37 |
| 7,322,777 B2 * | 1/2008 | Jager et al. | 408/153 |
| 7,530,769 B2 * | 5/2009 | Kress et al. | 408/1 R |
| 2004/0009046 A1 * | 1/2004 | Kress et al. | 409/132 |

FOREIGN PATENT DOCUMENTS

| | | |
|---|---|---|
| DE | 22 35 782 | 2/1973 |
| DE | 39 24 884 | 2/1991 |
| DE | 41 00 351 | 7/1991 |
| DE | 102 34 346 | 2/2004 |
| EP | 0 019 461 | 11/1980 |
| EP | 0 449 547 | 10/1991 |
| EP | 0 714 719 | 6/1996 |
| EP | 0 890 402 | 1/1999 |

(Continued)

OTHER PUBLICATIONS

International Search Report PCT/EP2007/000857 and English translation thereof.

*Primary Examiner*—Will Fridie, Jr.
(74) *Attorney, Agent, or Firm*—Larry R. Meenan

(57) ABSTRACT

A combination tool and method for metal-cutting machining of a drill-hole and its hole surface as well as cutting insert for such a combination tool.

20 Claims, 11 Drawing Sheets

FOREIGN PATENT DOCUMENTS

| | | |
|---|---|---|
| EP | 1 123 766 | 8/2001 |
| EP | 1 415 743 | 5/2004 |
| FR | 2 668 968 | 5/1992 |
| GB | 2 254 027 | 9/1992 |
| JP | 10 193203 | 7/1998 |
| JP | 11 277314 | 10/1999 |
| JP | 2007 069268 | 3/2007 |
| WO | WO 94/21411 | 9/1994 |
| WO | WO 94/26448 | 11/1994 |
| WO | WO 98/07543 | 2/1998 |
| WO | WO 2004/103617 | 12/2004 |
| WO | WO 2005/000519 | 1/2005 |
| WO | WO 2005/097383 | 10/2005 |
| WO | WO 2005/102574 | 11/2005 |
| WO | WO 2005/118188 | 12/2005 |

* cited by examiner

Fig. 5C
Fig. 5B
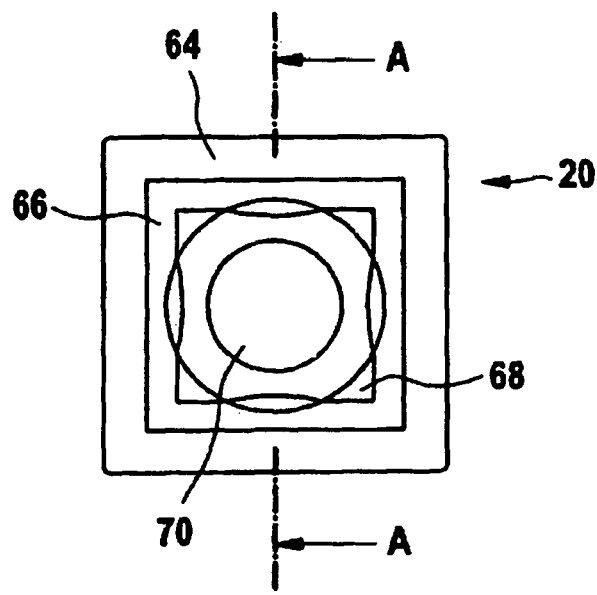
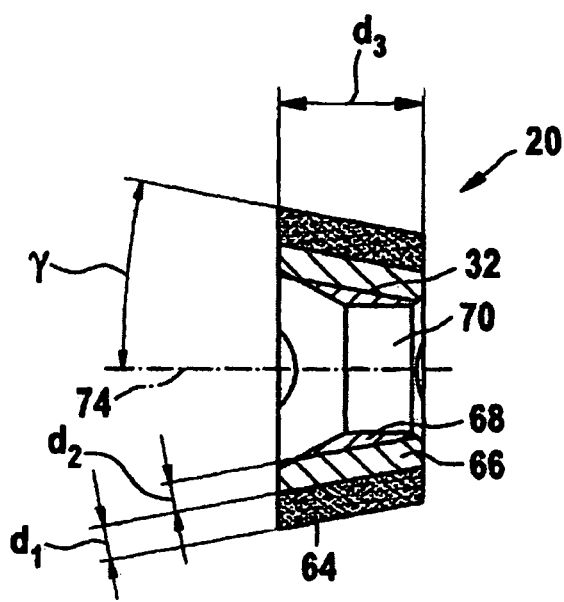
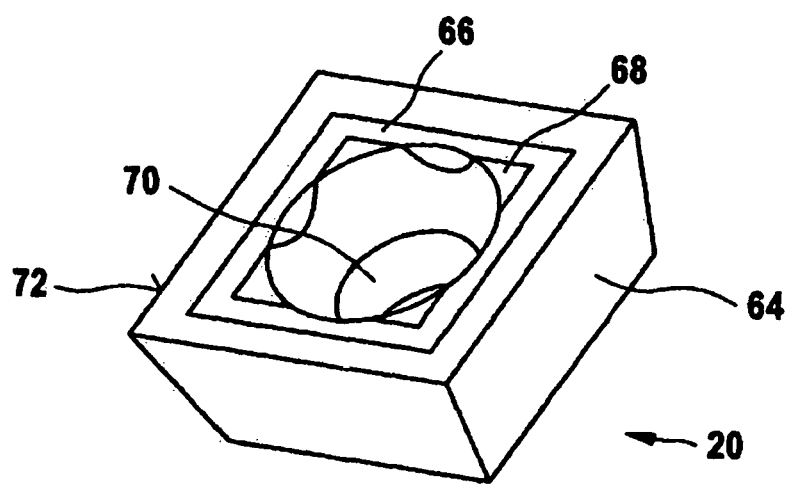
Fig. 5A

Fig. 7C
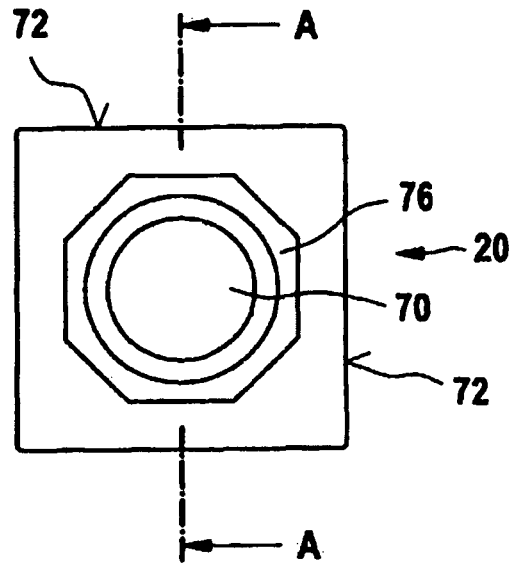
Fig. 7B
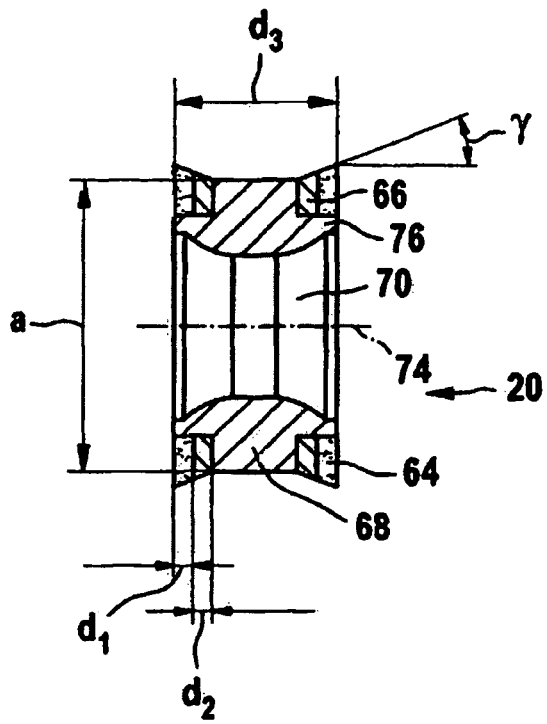
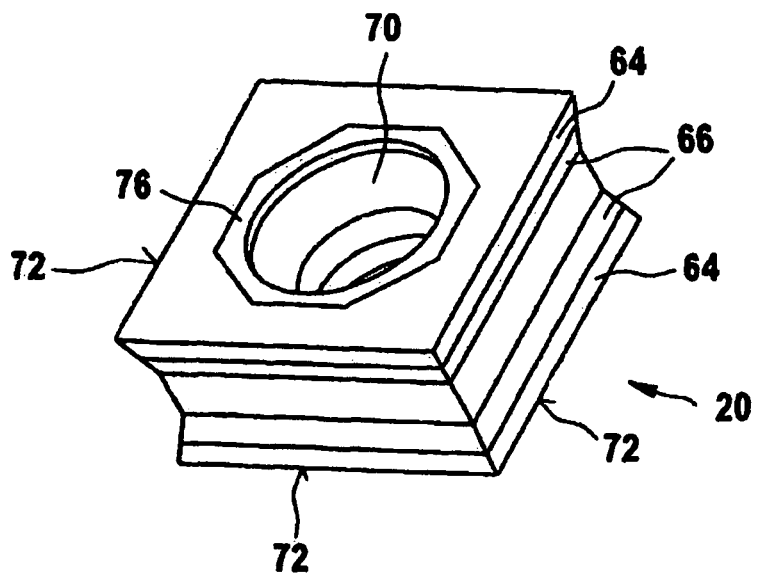
Fig. 7A

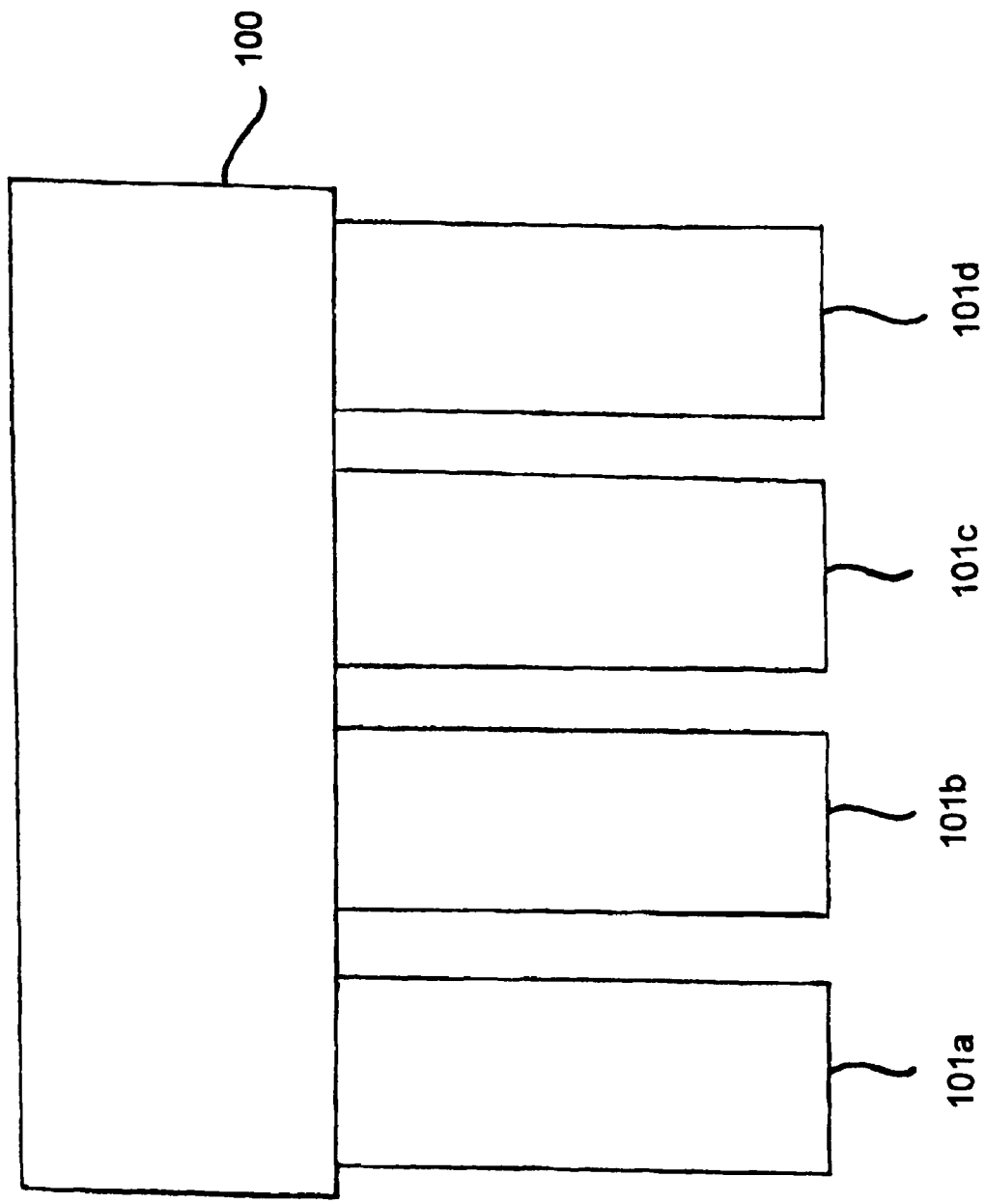

COMBINATION TOOL AND METHOD FOR METAL-CUTTING MACHINING OF A DRILL-HOLE AND ITS HOLE SURFACE AS WELL AS CUTTING INSERT FOR SUCH A COMBINATION TOOL

CONTINUING APPLICATION DATA

This application is a Continuation-In-Part application of International Patent Application No. PCT/EP2007/000857, filed on Feb. 1, 2007, which claims priority from Federal Republic of Germany Patent Application No. 10 2006 005 379.6, filed on Feb. 3, 2006. International Patent Application No. PCT/EP2007/000857 was pending as of the filing date of this application. The United States was an elected state in International Patent Application No. PCT/EP2007/000857.

BACKGROUND

1. Technical Field

The present application relates to a combination tool and a method for metal-cutting machining of a drill-hole and its hole surface, such as, in at least one possible embodiment, for metal-cutting machining of a valve stem bushing and its valve seat, the combination tool comprising a base body including a clamping chuck extending in axial direction for a turning tool for machining holes as well as at least one insert seat radially spaced from a centric longitudinal axis, for receiving a plate-shaped cutting insert. The cutting insert is provided for machining the hole surface and comprises two base sides which are situated opposite each other and connected with each other through small sides. The insert seat includes a base bearing face against which one of the base sides of the cutting insert is clamped in mounted condition. The present application also relates to a plate-like cutting insert for such a combination tool.

2. Background Information

The combination tool serves in particular for intermediate machining and finishing of the valve seat as well as of the valve stem bushing in particular of a motor-vehicle cylinder head.

To essentially assure a defined behavior of the inflow into, and the outflow out of, the combustion space of a motor-vehicle engine, lastingly during the entire lifetime of the engine, the faces of the cylinder head cooperating with an inflow or outflow valve have to be machined with high precision and with only minimum tolerances. In the manufacture of cylinder heads, usually guide bushes and valve-seat rings are fitted into corresponding recesses of an aluminum or cast-iron cylinder head. These guide bushes and valve-seat rings are usually subjected to a two-step machining process in which they are first of all machined intermediately and afterwards finished. For each of these steps, a combination tool is used with which both the cylindrical surface of the guide bush forming the valve stem bushing and the usually conical surface of the valve-seat ring are machined. For machining the valve stem bushing, usually a reamer is used as turning tool. For machining the valve seat, usually several cutting inserts are used, which are distributed over the circumference of the combination tool and are arranged to the axial axis in part at different cone angles, so that the valve seat, viewed in section, has several cone angles and that a kind of curved surface is formed.

To achieve the desired high-precision machining, an essentially exact and very precise concentric running of the combination tool is necessary or often necessary. The centric axes of the individual tool components, i.e. of the turning tool (reamer) as well as of the cutting inserts, must generally or exactly coincide with the axis or rotation. In addition, a very high angular accuracy is desired when setting the cone angle for the valve seat. As for machining a cylinder head, such as, in at least one possible embodiment, in large-batch manufacture, several combination tools are used in parallel and are advanced simultaneously, a very precise and accurate axial orientation of the combination tools to each other is usually also desired.

It should be noted that the preceding background information is for informational purposes only and does not necessarily admit that the subsequently mentioned publications are prior art.

OBJECT OR OBJECTS

The present application is based on the task to enable a high-precision machining of a valve stem bushing and of the adjacent valve seat.

SUMMARY

The task is solved according to the present application by a combination tool with the features of a base body, including a clamping chuck extending in an axial direction for a turning tool or reamer for machining holes, as well as at least one insert seat radially spaced from a centric longitudinal axis for receiving a plate-shaped cutting insert provided for machining the hole surface. The plate-shaped cutting insert comprises two base sides which are situated opposite each other and connected with each other through small sides. The insert seat of the base body includes a base bearing face against which one of the base sides of the cutting insert is clamped in mounted condition, wherein the base bearing face is oriented in such a way that a cutting insert arranged in the insert seat is oriented tangentially and that the base bearing face is oriented at a cone angle lying in the range of 200 to 80 degrees relative to the axial direction. The combination tool is fashioned in such a way that the plate-shaped cutting insert provided for machining the valve seat is designed as a tangentially arranged cutting tip. By tangential orientation, one understands in this case that the supporting face of the cutting insert, with which the latter is pressed against the insert seat, is oriented usually parallel or at least almost parallel to the surface to be machined. Through this arrangement, the small side of the cutting tip is oriented forwards, viewed in cutting and peripheral direction of the rotating tool, so that the cutting forces generated by the metal-cutting machining operation are passed into the tool parallel or virtually parallel to the supporting face and, thus, parallel or virtually parallel to the base bearing face of the insert seat. In this way, a very precise and stable guidance of the cutting insert is achieved, so that the surface can be machined with high precision. One advantage of the tangential arrangement, according to at least one possible embodiment, is the very accurate angular adjustment of the cutting tip relative to the surface to be machined, which in the case of a valve seat has the shape of an envelope of cone. In this embodiment, the cutting tip must, therefore, be oriented at a cone angle to the longitudinal axis of the tool. With the tangential arrangement, this angle is defined by the orientation of the base bearing face relative to the axial direction. The base bearing face is expediently oriented at a cone angle in the range of approximately 20 degrees to 80 degrees relative to the longitudinal axis. The inclination of the base bearing face to the axial direction can be adjusted in this case with very high precision by means of production techniques. It is a particular advantage that, contrary to a radially arranged cutting tip, a positioning of the cutting tip in a position which is somewhat rotated relative to the nominal position, due to play and tolerance, has usually or essentially only minimal effects on the high-precision angular adjustment. With a conventional radial orientation of the cutting tip, which is usual for combination tools, the large side (base side) of the cutting insert is oriented forwards, viewed in cutting direction, and even slight rotary deviations of the cutting tip from its nominal position will lead to considerable tolerance differences of the envelope-of-cone-shaped surface of the valve seat.

Another advantage of the tangential arrangement of the cutting tip, according to one embodiment of the present application, is the fact that the longitudinal or cross extension of the cutting tip, contrary to a radial arrangement, is not oriented radially to the axial centric longitudinal axis and, therefore, usually or essentially requires only very little space in a radial direction. As the space requirement in a radial direction is relatively high in case of a radial orientation, triangular cutting tips are used in particular in case of small diameters of the surfaces to be machined, due to the little space available. With the tangential arrangement described here, a square or polygonal cutting tip may be used, in one example of the present application, in order to keep the tooling costs low.

According to an expedient development, the chuck of the combination tool includes a clamping area and is designed in such a way that the clamping force in the clamping area acts peripherally and essentially uniformly in a radial direction and is, furthermore, adjustable by a clamping mechanism laterally fastened on the expansion chuck. Due to this embodiment, the clamping forces act, therefore, on all sides homogeneously upon the shank of the turning tool (reamer) to be clamped. In this way, an eccentric chucking of the turning tool with offset to the centric axis of the tool is avoided. This embodiment virtually assures a highly accurate and precise concentric running, so that a high-precision machining of the surface is essentially assured. At the same time, the laterally arranged clamping mechanism enables a chucking and exchanging of the turning tool even when the combination tool is mounted on a spindle of a machine tool. In one possible embodiment, that means that the changing of the turning tool does not require a removal of the combination tool from the machine tool.

In at least one possible embodiment, the clamping chuck is a hydraulic expansion chuck having a ring-like pressure space for generating the clamping force. This pressure space is a gap between an outer and an inner bushing within the cylindrical clamping area. The inner bushing is of a more fragile design than the outer bushing, so that in case of an increase of the pressure of a liquid in the pressure space, the exerted hydraulic pressure leads to a contraction of the inner bushing and thus to a uniform peripheral clamping of the shank of the turning tool. One example of a hydraulic expansion chuck which may possibly be used in at least one embodiment is described in WO 2005/097383. According to one embodiment of the present application, the expansion chuck includes an axial adjusting mechanism for adjusting the turning tools in an axial direction. In this case, too, the adjusting mechanism is actuatable by means of an adjusting element fastened laterally on the clamping chuck. Through the axial adjustment possibility, it is possible in a simple manner, such as, in at least one possible embodiment, when using several combination tools in parallel in a machine tool for simultaneously machining several valve seats, to adjust the individual combination tools in an axial direction to each other with high precision. Through such an adjustment, it is achieved that upon a combined infeed, all combination tools simultaneously engage the surface to be machined, as otherwise, irregular and asymmetrical forces would be passed into the common infeed mechanism, which would finally lead to a deterioration of the surface quality.

In one embodiment, the clamping chuck with the uniform peripheral clamping force acting in a radial direction, such as, in at least one possible embodiment, the hydraulic expansion chuck with the lateral adjusting elements, is combined with the tangential arrangement of the cutting inserts. Both the clamping chuck with the uniform peripheral distribution of the clamping forces and the tangential arrangement of the cutting inserts provide that the forces generated by the metal-cutting machining operation are transmitted substantially homogeneously onto the base body of the combination tool, whereby altogether a highly precise surface machining may be achieved.

To enable a relatively simple exchange and assembly of the cutting tip, the cutting insert is arranged, in one possible embodiment, in a cassette or insert holder including a cassette base body or insert holder base body which extends in an axial direction and on whose front end face the insert seat is arranged. Therefore, through the orientation of the insert seat oblique to the axial direction, the end face is arranged obliquely to the axial direction, at least in the area in which the insert seat is formed.

In one possible embodiment, the cassette or insert holder is arranged in a groove or recessed portion formed into a lateral wall on the base body and forming a cassette adaptor or insert holder adaptor, the bottom of the groove or recessed portion being oriented exactly or generally parallel to the axial direction.

According to another possible embodiment, it is, furthermore, provided that the cassette or insert holder together with the cutting tip fastened thereon is adjustable in an axial direction with the help of a first adjusting element. This adjusting element is clamped between a rear wall of the cassette or insert holder and the rear wall of the groove or recessed portion. Therefore, the adjusting element is supported in an axial direction by the rear wall of the groove or recessed portion. This embodiment offers the advantage that the forces acting in an axial direction, generated due to the axial feed by the metal-cutting machining operation, are essentially securely passed into the tool base body. As the adjusting element is clamped in an axial direction, virtually no axial play exists, so that the relatively exact nominal position of the cutting edge of the cutting tip is maintained even under high axial forces.

In one embodiment, the adjusting element is designed as a clamping wedge, which is displaceable with the help of a setting element designed in the manner of a screw, in the direction of the longitudinal axis of the setting element. The clamping wedge includes lateral wedge faces with which it acts upon the cassette or insert holder on the one hand and upon the rear wall of the groove or recessed portion on the other hand. In at least one possible embodiment of the present application, the setting element is oriented in a radial direction or almost in a radial direction, i.e. normal to the axial direction. Therefore, with this embodiment, the clamping of the wedges is achieved by displacing the wedges in direction of the longitudinal axis of the setting element, without requiring a rotary motion of the wedges. The setting element, in at least one embodiment, is designed as a two-thread setscrew, the threads acting in opposite directions, the front threaded part engaging the base body and the rear threaded part engaging the clamping wedge. By turning the setscrew, the relative position between the bottom of the groove or recessed portion and the clamping wedge may be varied, i.e. the clamping wedge is displaced in direction of the longitudinal axis of the setting screw. The pairs of clamping faces between the clamping wedge on the one hand, and the rear wall of the groove or recessed portion or the rear wall of the cassette or insert holder on the other hand, are arranged at such an angle that through this adjusting movement through the clamping wedge, a wedge effect is generated between the rear wall of the groove or recessed portion and the rear wall of the cassette or insert holder. Alternatively or in combination, the side faces of the clamping wedges, on both sides or only on one side, or else the counteracting faces of the rear wall of the groove or recessed portion and/or the rear wall of the cassette or insert holder, are designed with an oblique course in the manner of a wedge.

Altogether, the first adjusting element enables a simple and highly precise adjustment of the cutting tip in axial direction. This axial adjustment, which is independent of the axial adjustment of the turning tool, according to one possible embodiment of the present application, may be beneficial for parallel operation of several combination tools.

Furthermore, in one possible embodiment, a second adjusting element is provided in one development, with which the cassette or insert holder is adjustable in mounted condition in a radial direction. This radial adjustment possibility creates the possibility, such as, in at least one possible embodiment, if several cutting inserts are distributed over the circumference, to adjust these cutting inserts approximately exactly on a circular path.

The second adjusting element is designed, in at least one embodiment, as an adjusting screw which can be screwed into a thread of the cassette or insert holder and is supported by the base body. The cassette or insert holder is, therefore, pushed with the help of the adjusting screw against the groove bottom or recessed portion bottom of the cassette adaptor or insert holder adaptor. The two adjusting elements are usually secured against centrifugal forces.

In order that the machined surfaces may comply with desired levels of quality, often specially designed cutting inserts are provided, as described further herein. These cutting inserts are designed for application in the combination tool described herein, but can also be used in other tools, such as, in at least one possible embodiment, in tools in which a tangential orientation of the cutting inserts is provided.

In a first embodiment according to the present application, the plate-shaped cutting insert (cutting tip) includes an insert base body comprising two base sides which are situated opposite each other and connected with each other through small sides. A coating structure comprised of two layers is applied on the insert base body, which usually comprises or consists of carbide. This coating structure is arranged on a small side. The coating structure comprises or consists usually of a carbide layer on which a layer comprising or consisting of a cutting material, such as, for example, CBN or diamond, is applied. This layer structure is usually formed as a sintered compact, i.e. it is first of all pressed and then sintered. The finished sintered compact is then fastened on the insert base body, such as, in at least one possible embodiment, by brazing. The carbide layer of the coating structure can serve as a kind of adhesion promoter between the insert base body and the layer consisting of the cutting material. The thickness of the cutting-material layer is usually only a few tenths of a millimeter. The arrangement of the coating structure on the small side virtually assures for the tangential arrangement of the cutting tip that even in case of a deep engagement of the cutting tip with the surface to be machined (cutting depth), exclusively or essentially only the cutting material gets into contact with the surface to be machined, because due to the tangential orientation, the cutting tip engages the surface with its small side ahead.

In other words, coating the small sides of the cutting insert with a cutting material allows for the cutting insert to be arranged tangentially in such a way that only or essentially only the cutting material applied to the small sides of a cutting insert is in contact with the surface to be machined.

Often, the cutting tip is designed as an indexable insert with usually four cutting edges (on one base side).

In order to virtually assure that in the corner area where the two small sides meet, the cutting material forms the outer surface in each place, the layers meet, according to a development, in the abutting edge in a mitered manner, i.e. the layer structure applied on the small sides is provided on each of its end sides, in the manner of ledges, with a chamfer of, for example, 45 degrees, the so-called mitered joint, so that two substantially adjacent layer-structure ledges are not butt-jointed.

In other words, in at least one possible embodiment of the present application, the layers of the cutting insert meet where two small sides abut in a mitered manner, wherein the vertex of the angle of the miter joint is disposed at the corner of the insert base body and the miter joint extends outward from the corner at a 135 degree angle from the small side, to assure or essentially assure that the corners of the cutting insert are uniformly covered with cutting material.

In an alternative embodiment, the layer structure is applied on the full surface of the base side of the insert base body, a central fastening hole being usually provided in the middle, through which a fastening screw for fastening the cutting tip on the insert seat is provided. The layer structure (sintered compact) is, therefore, designed as a perforated plate brazed onto the insert base body.

The task is furthermore solved according to the present application by a method for metal-cutting machining of a drill-hole and its drill-hole surface in one operation, such as, in at least one possible embodiment, for metal-cutting machining of a valve stem bushing and its valve seat with the combination tool described here. The advantages and embodiments mentioned with regard to the combination tool can be applied analogously to the method.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Some exemplary embodiments of the present application are explained in detail by means of the drawings

FIG. 5A is a perspective view of an indexable insert of a first embodiment;

FIG. 5B is a top view of the base side of the indexable insert according to FIG. 5A; and FIG. 5C is a sectional view of the indexable insert along line A-A in FIG. 5B;

FIG. 7A is a perspective view of a double-sided indexable insert of a further embodiment, FIG. 7B is a top view of a base side of the indexable insert according to FIG. 7A;

FIG. 7C is a section along line A-A in FIG. 7B; and

FIG. 8 is a block diagram of a group of combination tools. Parts of identical effect are marked with the same reference numbers in the figures. In other words, reference numbers remain uniform throughout the figures.

DESCRIPTION OF EMBODIMENT OR EMBODIMENTS

Figure 1A:
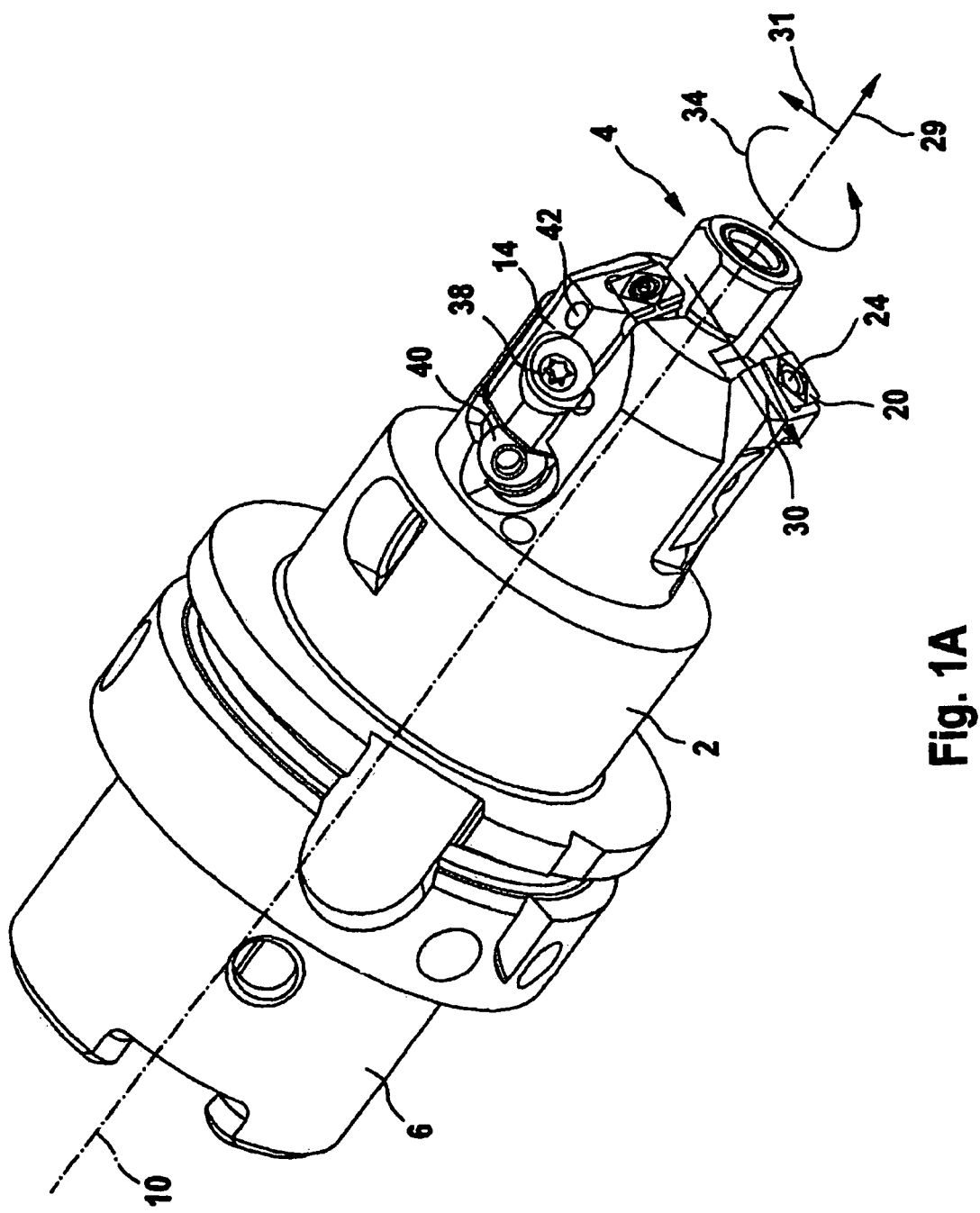
FIG. 1A is a perspective view of a combination tool with a hydraulic expansion chuck and tangentially arranged indexable inserts.
Figure 1B:
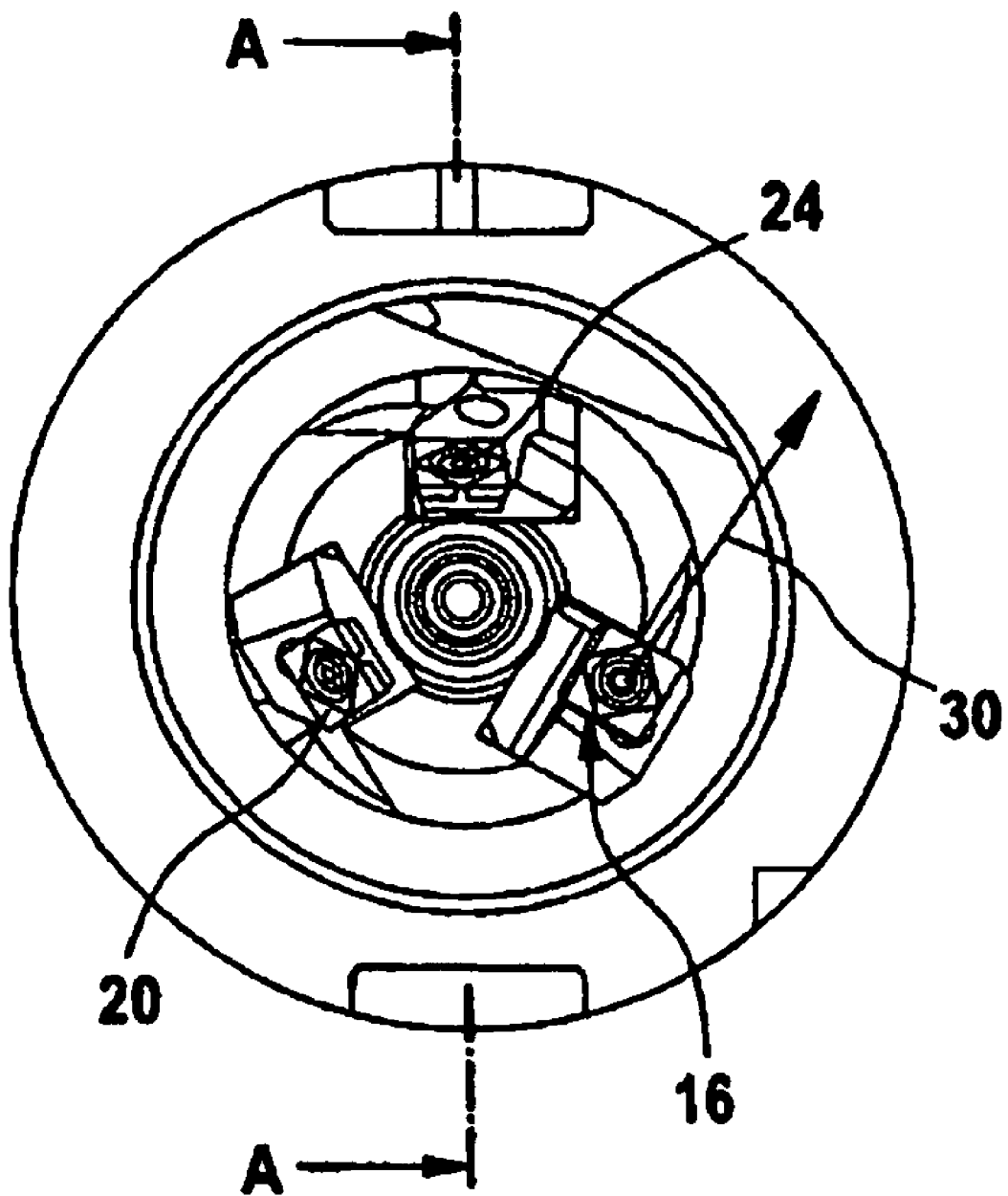
FIG. 1B is a top view of the front face of the combination tool according to FIG. 1A.
Figure 1C:
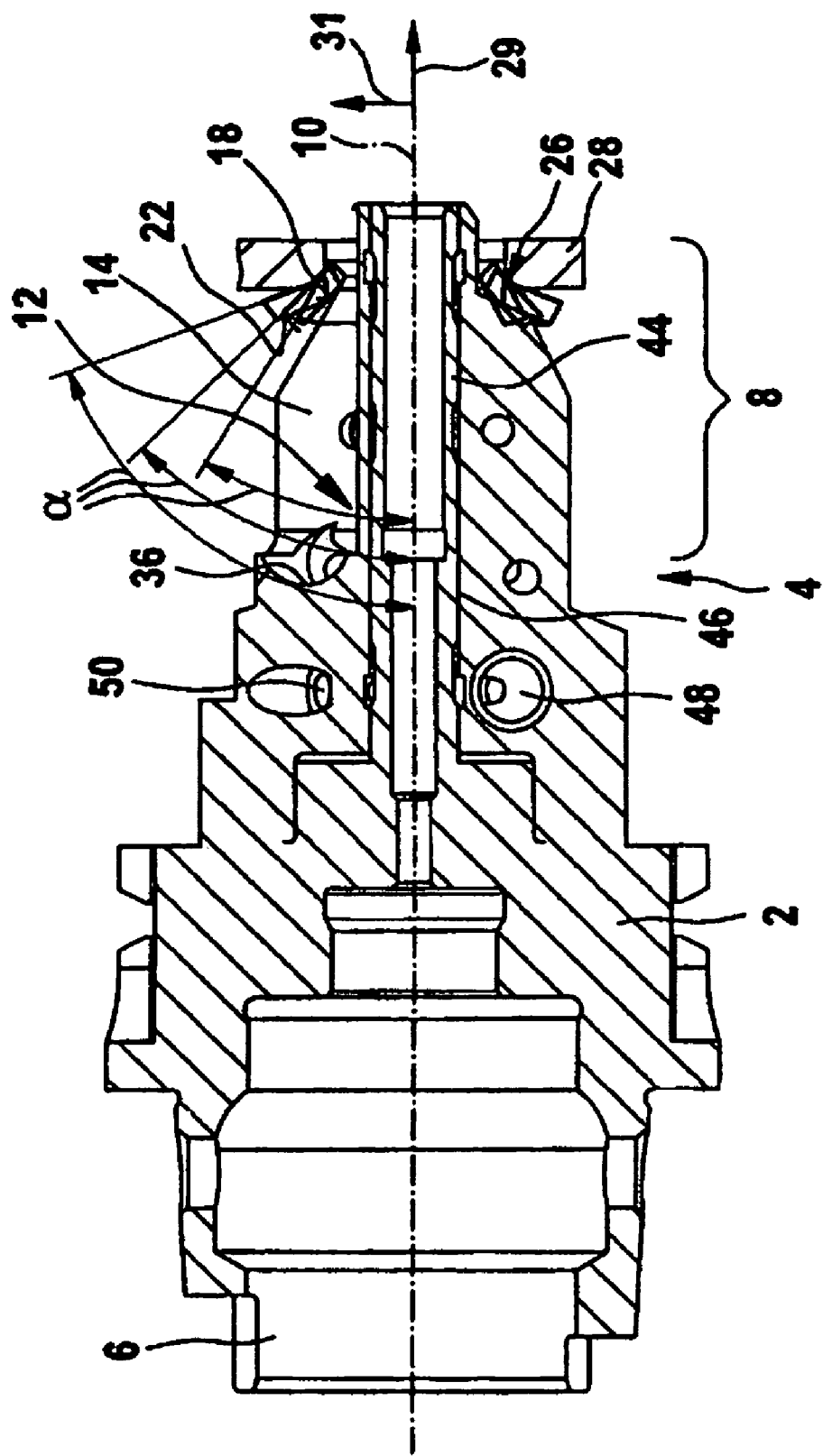
FIG. 1C is a section along line A-A in FIG. 1B.
Figure 1D:
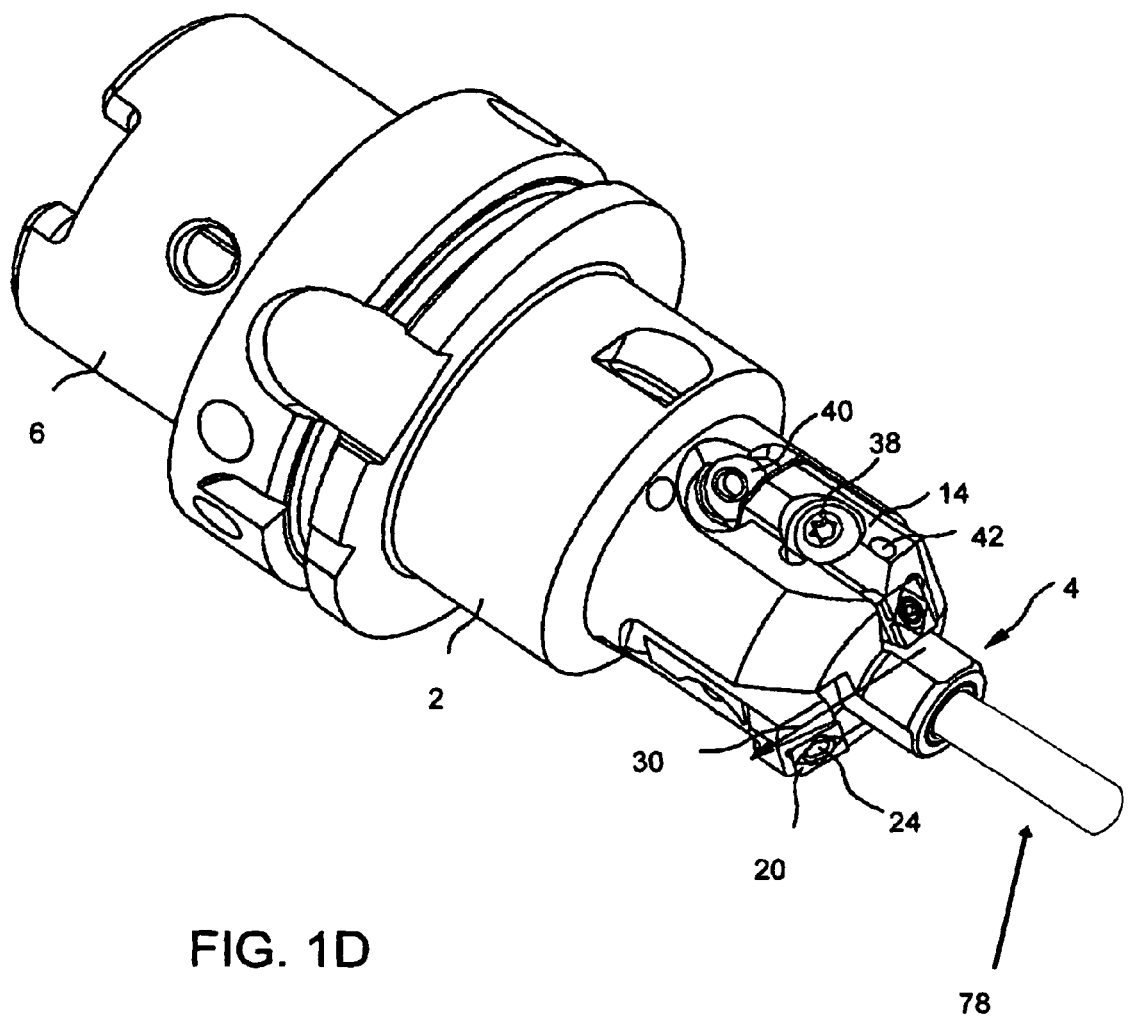
FIG. 1D is a perspective view of a combination tool with tangentially arranged indexable inserts and a reamer.

The combination tool 101 of the exemplary embodiment of FIGS. 1A to 1D comprises a base body 2 of compact and narrow dimensions with an integrated hydraulic expansion chuck 4. The combination tool 101 is connected with a tool spindle by means of a rear connector piece 6. The front end of the expansion chuck 4 includes a cylindrical clamping area 8. The clamping area 8 serves for receiving a turning tool, such as, in at least one possible embodiment, a reamer 78, shown in FIG. 1D. Laterally of the clamping area 8 and spaced radially from a centric longitudinal axis 10 of the combination tool 101, altogether three cassette adaptors or insert holder adaptors, worked into the base body 2 in the manner of grooves or recessed portions, are distributed over the circumference. In the cassette adaptors or insert holder adaptors 12, exchangeable cassettes or insert holders 14, including on their front end face an insert seat 16 with a base bearing face 18, are fastened. One cutting tip 20 each is clamped against said base bearing face 18 with one of its base sides, in the following referred to as bearing side 22. For clamping, a clamping screw 24 passed centrically through the cutting tip 20 is provided. The cutting inserts 20 uniformly distributed over the circumference are oriented, as indicated in FIG. 1C, relative to the centric longitudinal axis 10 at different cone angles $\alpha$. For example, as shown in FIG. 1C, the three cutting inserts 20 are, in at least one possible exemplary embodiment, oriented relative to the centric longitudinal axis 10 at 30 degrees, 45 degrees and/or 70 degrees, whereby a valve seat 26 of a valve seat ring 28 is provided with a somewhat curved surface. As can be seen further from FIG. 1C, each of the three cutting inserts generates a partial envelope of cone. In FIG. 1C, the three cutting inserts are shown positioned one on top of the other, just for illustration.

The combination tool 101 extends in an axial direction 29. A radial direction 31 is defined normal to the axial direction 29. Finally, a circumferential or tangential direction 30 is defined normal to both the radial direction 31 and the axial direction 29.

In one possible exemplary embodiment as shown in FIGS. 1A to 1D, all cutting inserts 20 are arranged tangentially. Tangential arrangement means in this case that the bearing side 22 is substantially oriented in a tangential direction 30. The bearing side 22 is inclined relative to the generally exactly or exactly tangential orientation by only or essentially only a slight angle forming a clearance angle. Therefore, the position of the bearing side 22 is defined on the one hand by the orientation at the cone angle a relative to the centric longitudinal axis 10 and on the other hand, by the orientation in the tangential direction 30. With such a tangential arrangement of the cutting insert 20, the latter cuts with one of its small sides 32 (see in particular FIG. 1A), oriented forwards in the direction of rotation or cutting direction 34. Therefore, the chips removed are carried off, with a tangential orientation, along the small side 32. The cutting forces act in the tangential direction 30. As the cutting tip 20 has its large extension in the tangential direction 30 (usually, the bearing side is approximately 3 to 5 times longer than the small side), the cutting forces are substantially absorbed by the cutting tip 20, without causing vibrations or a substantial number or magnitude of vibrations. Furthermore, the rear small side as well as one lateral small side of the cutting tip 20 each abut on a side wall of the insert seat 16.

To form the cassette adaptor or insert holder adaptor 12, three grooves or recessed portions, uniformly distributed over the circumference, extend in axial direction 29 in the base body 2. As can be seen from FIG. 1C, the cross-section of the cassette adaptor or insert holder adaptor 12 is approximately L-shaped, i.e. it is open towards the front, towards the end face, and includes on its rear side a groove or recessed portion rear wall 36. The cassette or insert holder 14 itself includes in its front area a beveled end face which at the same time defines the insert seat 16.

The cassette or insert holder 14 is fastened in the cassette adaptor or insert holder adaptor 12 with the help of a substantially radially oriented fastening screw 38. In the rear area, the cassette or insert holder 14 is followed by a clamping wedge 40 clamped between the cassette or insert holder 14 and the groove or recessed portion rear wall 36 (see in particular FIG. 1A). The clamping wedge 40 serves for adjusting the cassette or insert holder 14 in axial direction 29. Furthermore, a radial adjusting screw 42 is provided in the front third of the cassette or insert holder 14, before the beveled end face of the cassette or insert holder 14 begins. The latter offers the possibility to adjust the cassette or insert holder 14 in radial direction 31 relative to the base body 2. The adjusting screw 42 is supported by the bottom of the groove or recessed portion of the cassette adaptor or insert holder adaptor 12.

The hydraulic expansion chuck 4 includes a central inner clamping sleeve 44 forming with the enclosing area of the base body 2 an annular gap 46 having a radial width of maximally 0.2 millimeters. The annular gap 46 forms a pressure space and is part of a pressure system. The pressure space is filled with a hydraulic liquid. By means of a pressure-setting screw 48, a piston, which is not represented here in detail, is actuated, so that the pressure in the pressure space can be varied by turning the pressure-setting screw 48. The pressure-setting screw 48 is fixed laterally on the expansion chuck 4 and is accessible from there. To clamp a turning tool (reamer) 78, the shank of the latter is inserted into the clamping sleeve 44, and then, the pressure in the pressure system and thus in the annular gap 46 is increased by turning the pressure-setting screw 48, so that the clamping sleeve 44 is clamped radially against the clamping shank all around. Due to the use of a hydraulic system, a homogeneous pressurization is effected in this way, so that the turning tool 78 is automatically aligned generally or essentially exactly along the centric longitudinal axis 10, without any offset or substantial offset occurring between the centric longitudinal axis of the turning tool 78 and the centric longitudinal axis 10 of the base body 2.

In addition, an axial adjustment possibility is provided for the reamer 78. For this purpose, a setting screw 50 (FIG. 1C), which is also accessible from the side, acts upon an axially displaceable setting pin, not represented here in detail, against which the reamer hits in clamped condition. In one possible embodiment of the present application, the setting pin includes in its end area, where it cooperates with the setting screw 50, a toothing which is engaged by the thread of the setting screw 50.

The combination tool 101 described in connection with FIGS. 1A to 1D is suitable for a highly precise machining of a valve-seat bushing of a valve seat 26, such as, in at least one possible embodiment, due to the combination of the features summarized once more as follows:

The use of a hydraulic expansion chuck 4 virtually assures an exact or essentially exact orientation of the reamer 78 along the centric longitudinal axis 10. At the same time, this principle of construction provides a very compact and space-saving structure, so that several of such combination tools 101 can be used in parallel side by side for machining motor units, as seen in FIG. 8.

The axial adjustment possibility of the reamer 78 allows a precise adjustment in an axial direction, such as, in at least one possible embodiment, when using several combination tools 101 in parallel. As both the clamping mechanism (pressure-setting screw 48) and the axial adjustment mechanism (setting screw 50) are accessible from the side of the clamping chuck 4, the tool 78 can or may easily be exchanged, without having to dismount the combination tool from the machine. The axial adjustment possibility is, furthermore, given even while the reamer 78 is inserted.

Thanks to the tangential orientation of the cutting inserts 20, the cutting forces are absorbed in a secure and vibration-free manner.

Through the tangential arrangement of the cutting tip 20, a rotation of the cutting tip 20 within the insert seat 16, relative to its nominal position, due to tolerances, will have no effect or almost no effect on the orientation of the cutting edge of the cutting tip 20 concerning the cone angle α, i.e. the tangential arrangement is relatively insensitive with regard to the angular accuracy when forming the cone angle of the valve seat 26. This is a particular advantage because for the valve seats 26, an extremely high angular accuracy of, for example, ±5 minutes is usually desired.

The fastening of the cassette or insert holder 14 in the groove-like or recessed portion-like cassette adaptor or insert holder adaptor 12 additionally generally assures a secure guidance, and the forces generated by cutting are reliably absorbed by the base body 2, without vibrations or substantial vibrations occurring.

The clamping wedge 40 allows an adjustment of the cutting tip 20 in axial direction 29, which is an advantage generally when using several combination tools 101 in parallel.

The clamping of the clamping wedge 40 between the cassette or insert holder 14 and the cassette adaptor or insert holder adaptor 12 securely fixes the axial position and avoids or generally diminishes a maladjustment in axial direction.

Finally, the radial adjustment possibility of the cassette or insert holder 14 allows to adjust also the cone angle α, if necessary, because due to the arrangement of the radial adjusting screw 42 in the front third, adjacent to the clamping screw 24, a tilting motion of the cassette or insert holder 14 takes place when the adjusting screw 42 is actuated, so that the cone angle α of the cutting tip 20 changes.

The structure of the cassette or insert holder 14 and its cooperation with the clamping wedge 40 can be seen also in FIGS. 2A to 2D. The clamping wedge 40 is provided with a two-thread setscrew 52 having two thread parts acting in opposite directions. The front thread part of the clamping wedge 40 engages in mounted condition a thread in the base body 2 and its rear thread part is screwed into the clamping wedge 40. The two-thread setscrew 52 is oriented along a longitudinal axis 54, which is inclined to a cassette or insert holder rear wall 56. One wedge face of the clamping wedge 40 abuts the cassette or insert holder rear wall 56. On the side opposite the plane wedge face, the clamping wedge 40 is rounded in the manner of an envelope of cone. The envelope-of-cone-shaped surface of the clamping wedge abuts with substantially exact fit the groove or recessed portion rear wall 36 in a corresponding seating in the base body 2. In other words, the outer surface of the clamping wedge 40 meets with the groove or recessed portion rear wall 36 when the cassette or insert holder 14 is situated in the cassette adaptor or insert holder adaptor 12. When the two-thread setscrew 52 is adjusted, the clamping wedge 40 is displaced along the longitudinal axis 54, so that the position of the cassette or insert holder is modified in axial direction 29.

In the exemplary embodiment of FIGS. 2A to 2D, the cutting tip 20 has a cutting corner 58, with which the cutting tip 20 engages the workpiece during the machining operation. The embodiment variant according to FIGS. 1A to 1D shows a total of four cutting corners 58. The cutting corners are usually provided with a coating made of a hard cutting material, such as, in at least one possible embodiment of the present application, a CBN coating.

Figure 2A:
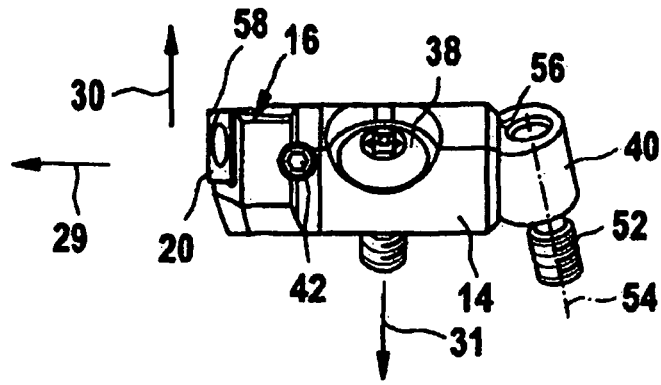
FIG. 2A is a side view of a cassette or insert holder to be used in the combination tool according to FIGS. 1A-1C together with a clamping wedge.
Figure 2D:
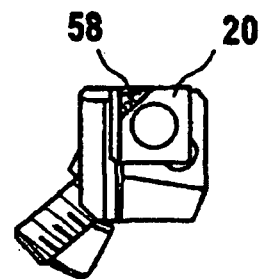
FIG. 2D is a top view of the insert-side front face of the cassette or insert holder according to FIG. 2A.
Figure 2B:
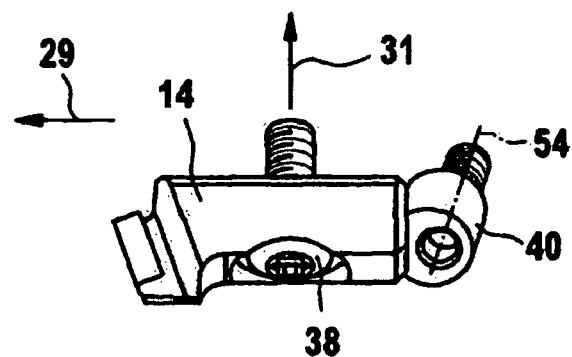
FIGS. 2B and 2C are views of the cassette or insert holder according to FIG. 2A, turned by 90 degrees in each case.
Figure 2C:
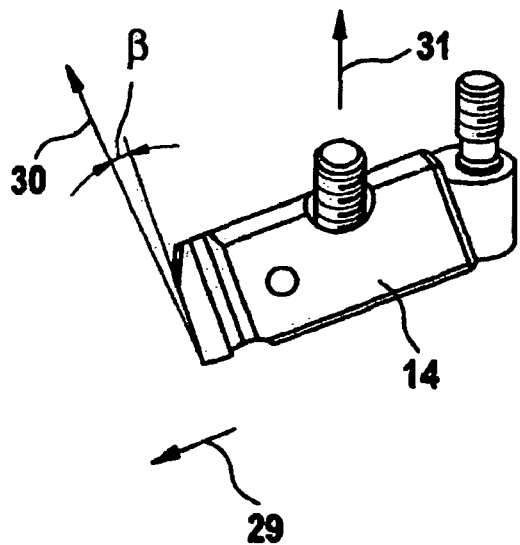

As can be seen in FIG. 2C, the cutting tip 20 is not oriented exactly parallel to the tangential direction 30, but includes with it a clearance angle β lying, for example, in the range between 3 degrees and 10 degrees. In other words, in FIG. 2C, the cutting tip 20 is oriented so that it is not exactly parallel with the tangential direction 30, but rather lies askew from the tangential direction 30 by clearance angle β, which may range, in possible embodiments, between 3 and 10 degrees. In the exemplary embodiment, the clearance angle β is 5 degrees.

Figure 3:
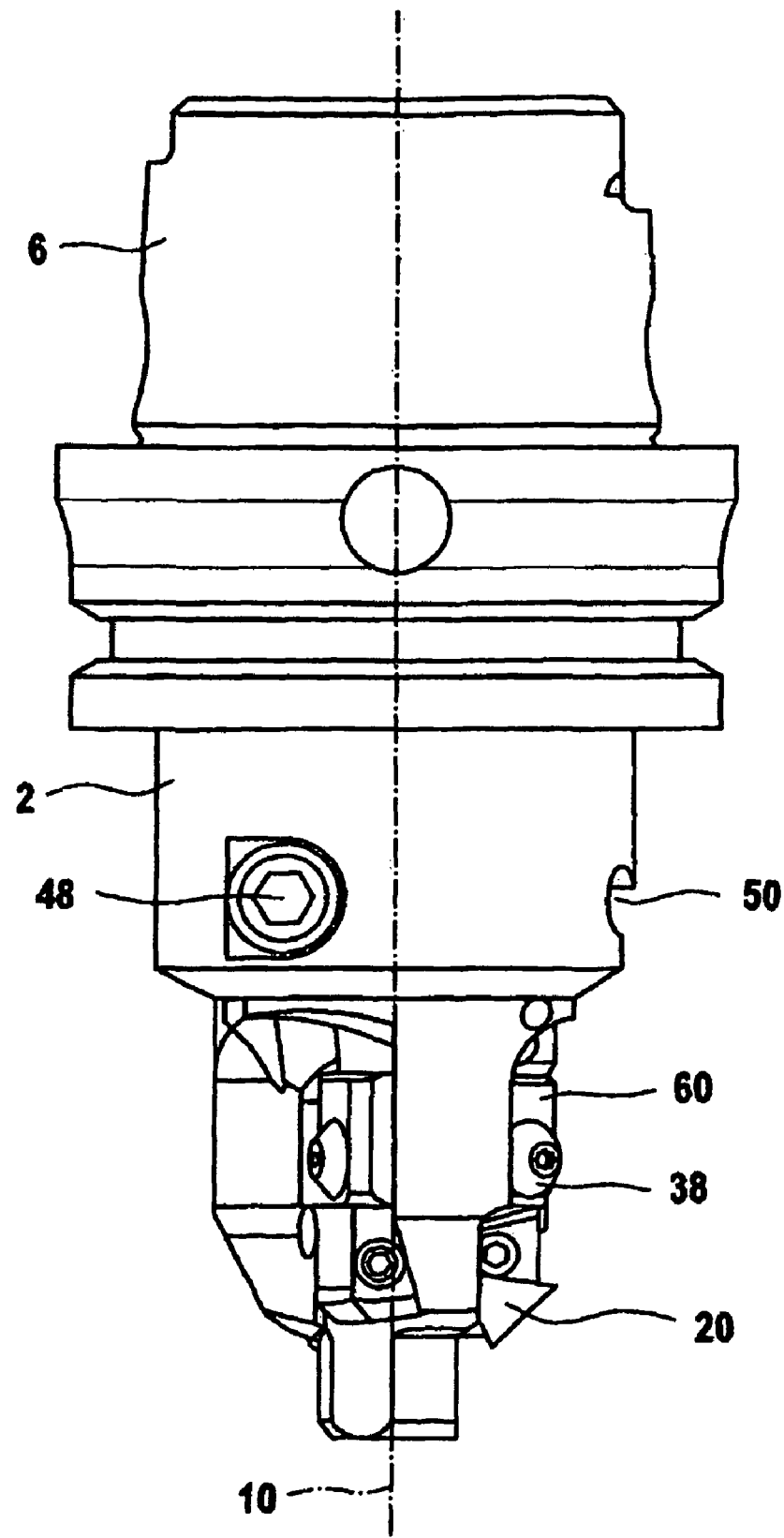
FIG. 3 is an alternative embodiment of the combination tool with a hydraulic expansion chuck and a radial arrangement of the indexable inserts.
Figure 4A:
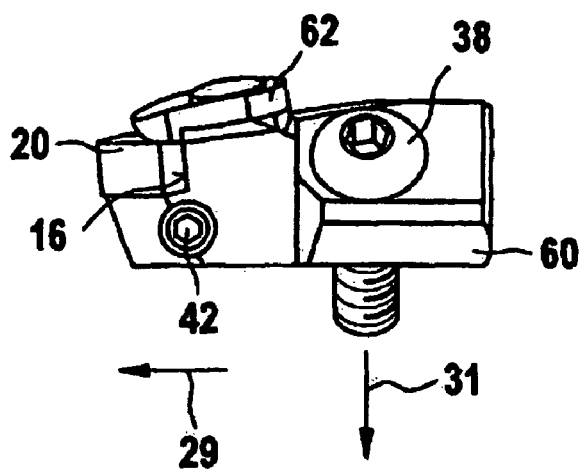
FIG. 4A is a side view of a cassette or insert holder for a radial arrangement of the indexable insert.
Figure 4C:
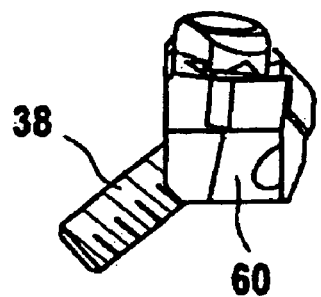
FIG. 4C is a top view of the insert-side front face of the cassette or insert holder according to FIG. 4A.
Figure 4B:
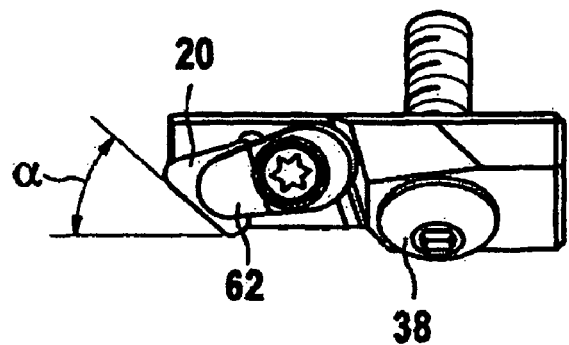
FIG. 4B is a view of the cassette or insert holder according to FIG. 4A, turned by 90 degrees.

In the exemplary embodiment according to FIG. 3, too, the expansion chuck 4 described in connection with FIGS. 1A to 1D is used for the combination tool 101. Contrary to the exemplary embodiment according to FIGS. 1A to 1D, however, usual cassettes or insert holders 60 with radially arranged cutting inserts 20 are used. As cutting inserts, such as, in at least one possible embodiment, triangular indexable inserts are applied in this case. For reasons of space, such as, in at least one possible embodiment, with smaller valve seats 26, it may not be possible to apply square or polygonal indexable inserts 20. With the exception of the radial orientation of the cutting inserts 20, the structure of the combination tool 101 corresponds to that of the combination tool 101 described in connection with FIGS. 1A to 1D. The special structure of the cassette or insert holder 60 is shown in FIGS. 4A to 4C. The triangular cutting insert 20 is clamped with the help of a clamping claw 62. FIG. 4B shows that the cone angle α is determined by the orientation of one of the three sides of the triangle, forming the cutting edge.

FIGS. 5 to 7 show indexable inserts 20 of different designs, provided for use with the combination tool 101 described before, such as, in at least one possible embodiment, with the tangentially arranged insert seat 16. All cutting inserts 20, as shown in FIGS. 5 to 7, are provided with a coating structure comprising or consisting of two layers. The outer layer 64 comprises or consists of a cutting material, such as, in at least one possible embodiment, CBN or else diamond. The inner layer 66, situated below, comprises or consists of carbide. The layer structure consisting of or comprising these two layers 64, 66 is applied on an insert base body 68, such as, in at least one possible embodiment, by brazing. Prior to that, the layer structure is manufactured as a sintered compact. Furthermore, all cutting inserts 20, as shown in FIGS. 5 to 7, include a central fastening hole 70 through which the clamping screw 24 is passed.

In at least one embodiment, the layer thickness d1 of the outer layer lies in the range of some tenths of a millimeter, for example in the range of 0.3 up to approximately 0.8 millimeters. The layer thickness d2 of the inner layer 66 is of similar size. In an exemplary embodiment, the layer thickness d1 of the outer CBN layer is 0.7, the layer thickness d2 of the inner carbide layer 66 is 0.6 millimeters. In exemplary embodiments, opposite cutting edges 72 are apart by a distance a in the range of approximately 12 millimeters. The insert thickness d3 is approximately 6.4 millimeters.

Figure 6B:
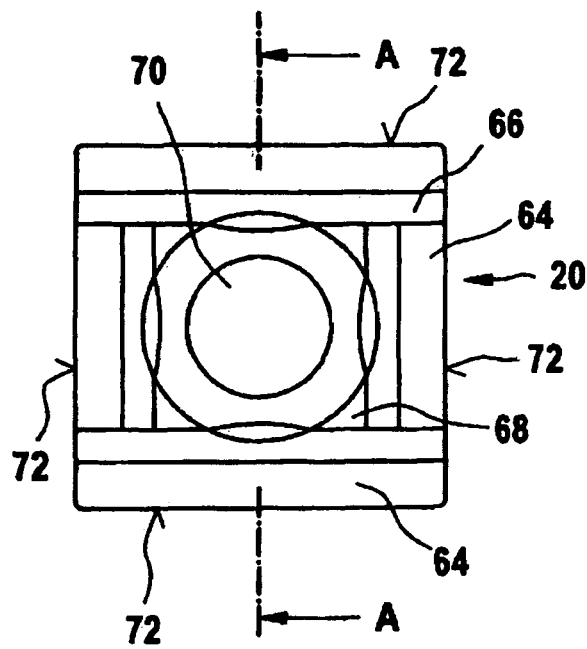
FIG. 6B is a top view of a base side of the indexable insert according to FIG. 6A.
Figure 6C:
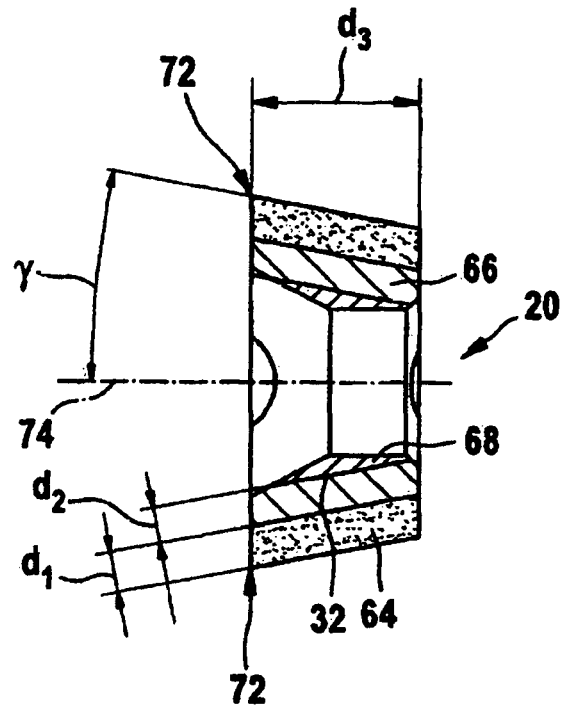
FIG. 6C is a sectional view of the indexable insert along line A-A in FIG. 6B.
Figure 6A:
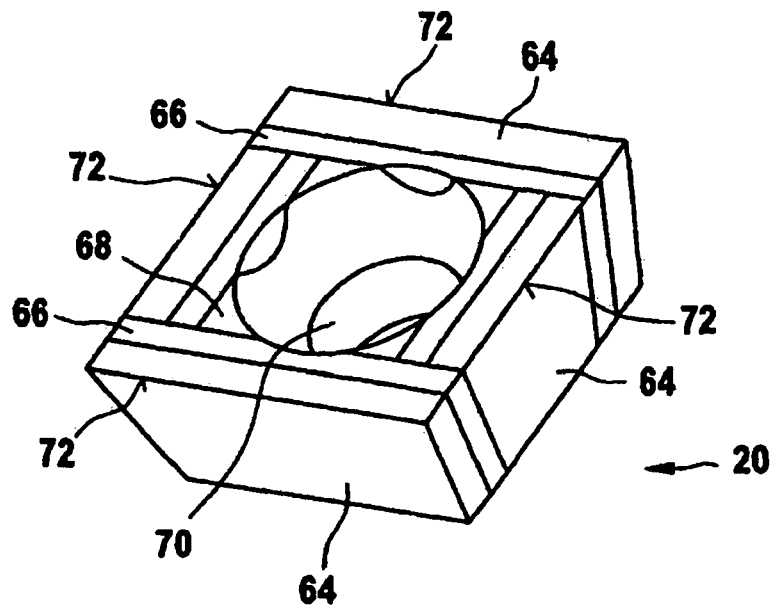
FIG. 6A is a perspective view of another embodiment of the indexable insert.

In the exemplary embodiments of FIGS. 5 and 6, the coating structure is premanufactured in the form of narrow ledges applied on the small sides 32 of the insert base body 68. In the embodiment variant according to FIGS. 5A to 5C, the individual ledges of the coating structures are mitered, so that the outer layer 64 forms the outer edge of the small sides 32 all around. In other words, in the one embodiment shown in FIGS. 5A to 5C, each coating layer of the cutting insert is mitered, so the outer edges of small sides 32 are comprised only or virtually only of outer layer 64. Contrary to that, the individual ledges of the exemplary embodiment of FIGS. 6A to 6C are butt-jointed, so that in partial areas, the inner layer 66, too, appears on the outside.

Each of the cutting inserts 20 represented in FIGS. 5 and 6 includes four cutting edges 72. The small sides are inclined by an angle γ to an insert vertical 74. This angle lies, for example, in the range of approximately 10 degrees to 15 degrees. Alternatively to the embodiment variant according to FIGS. 6A to 6C, an indexable insert 20 is designed in a simple variant with only two opposite cutting edges 72.

In the arrangement of the layer structure on the small sides, with a tangential orientation of the cutting tip 20, the chip is removed over the small side, i.e. it slides along the small side over the outer layer 64. With the tangential orientation, the cutting depth is determined by the depth of plunging of the cutting tip 20 into the workpiece to be machined, namely essentially in direction of the insert vertical 74. Therefore, independently of the cutting depth, due to the arrangement of the layer structure on the small sides 32, the outer layer 64 is essentially always in engagement with the workpiece to be machined. In other words, the coating layers are arranged on the small sides 32 in such a way that the outer layer 64 is the only or essentially only surface that comes into contact with the workpiece to be machined, regardless of the cutting depth.

In the exemplary embodiment of FIG. 7, contrary to the exemplary embodiments of FIGS. 5 and 6, the layer structure is applied on opposite base sides of the insert base body 68 and not on the latter's small sides. In this case, it is of particular importance that the layer structure is designed as a continuous plate, only including a central fastening hole 70.

In the exemplary embodiment of FIGS. 7A to 7C, the indexable insert 20 is designed as a double-sided indexable insert with a total of eight cutting edges 72. The angle γ, forming a clearance angle, is achieved through a front-face bevel of the plate-shaped layer structure, as shown in FIG. 7C. Due to this special structure, the base body 68 itself does not include any bevels. Alternatively to the double-sided indexable insert 20 of FIGS. 5 to 7, the layer structure can, of course, also be applied on one side only.

The insert base body 68 includes, furthermore, a central centering ring 76, arranged around the fastening hole 68 and having a polygonal, in the exemplary embodiment octagonal, outer profile. Corresponding hereto, the layer structure, too, has a polygonal inner profile, so that the plate to be applied on the insert base body 68 will be arranged in the correct rotational position.

FIG. 8 is a block diagram representing a group of combination tools 101a, 101b, 101c, and 101d, which are mounted on a spindle of machine tool 100, for machining, for example, motor units in parallel operation. The tangential arrangement of the cutting inserts 20 allows the combination tool 101 to have a more narrow or compact structure, so several tools can be placed side-by-side to complete the finishing process for valve seats and valve stem structures in one machining operation. For example, a motor vehicle engine can comprise four to eight valve seats and valve stem structures. Finishing more than one valve seat and valve stem structure may or will effectively save time in the machining process. One advantage of fastening the cutting inserts 20 to the tool body 2 of the combination tool 101 at an angle of a valve seat α, in one possible embodiment of the present application, is the combination tool 101 is more narrow and compact, which allows several combination tools 101 to be placed together with a minimal distance in between them. Such a compact arrangement also allows for the machining of smaller structures, such as small engines.

To enable a high-precision machining of a valve seat 26 as well as of a valve seat bushing, the combination tool 101 includes an expansion chuck 4, such as, in at least one possible embodiment, a hydraulic expansion chuck, provided for receiving a fine-turning tool 78 for machining the valve stem bushing. At the same time, several cutting inserts 20, such as, in at least one possible embodiment, tangentially arranged cutting inserts, are distributed over the circumference. These are usually fastened in a cassette or insert holder 14 which can be adjusted both in axial direction 29 and in radial direction 31.

One feature or aspect of an embodiment is believed at the time of the filing of this patent application to possibly reside broadly in a combination tool for metal-cutting machining of a drill-hole and its hole surface, such as, in at least one possible embodiment, for metal-cutting machining of a valve stem bushing and its valve seat 26, having a base body 2 including a clamping chuck 4 extending in axial direction 29 for a turning tool 78 for machining holes as well as at least one insert seat 16 radially spaced from a centric longitudinal axis 10, for receiving a plate-shaped cutting insert 20 provided for machining the hole surface and comprising two base sides 22 which are situated opposite each other and connected with each other through small sides 32, the insert seat 16 including a base bearing face 18 against which one of the base sides 22 of the cutting insert 20 is clamped in mounted condition, wherein the base bearing face 18 is oriented in such a way that a cutting insert 20 arranged in the insert seat 16 is oriented tangentially and that the base bearing face 18 is oriented at a cone angle α lying in the range of 200 to 80 degrees relative to the axial direction 29.

The components disclosed in the various publications, disclosed or incorporated by reference herein, may possibly be used in possible embodiments of the present invention, as well as equivalents thereof.

Another feature or aspect of an embodiment is believed at the time of the filing of this patent application to possibly reside broadly in the combination tool, wherein the clamping chuck 4 includes a clamping area 8 and is designed in such a way that the clamping force in the clamping area 8 acts peripherally and uniformly in radial direction 31 and is adjustable by a clamping mechanism 48 fastened laterally on the clamping chuck 4.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Yet another feature or aspect of an embodiment is believed at the time of the filing of this patent application to possibly reside broadly in the combination tool, wherein the clamping chuck 4 is a hydraulic expansion chuck including a pressure space 46 in the manner of an annular gap for generating the clamping force.

The appended drawings in their entirety, including all dimensions, proportions and/or shapes in at least one embodiment of the invention, are accurate and are hereby included by reference into this specification.

Still another feature or aspect of an embodiment is believed at the time of the filing of this patent application to possibly reside broadly in the combination tool, wherein the clamping chuck 4 includes an axial adjusting mechanism for adjusting the turning tool 78 in axial direction 29, the adjusting mechanism being actuatable by means of an adjusting element 50 fastened laterally on the clamping chuck.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

A further feature or aspect of an embodiment is believed at the time of the filing of this patent application to possibly reside broadly in the combination tool, wherein an exchangeable cassette or insert holder 14, 60 is provided, including a cassette base body or insert holder base body which extends in axial direction 29 and on whose front end face the insert seat 16 is arranged.

All, or substantially all, of the components and methods of the various embodiments may be used with at least one embodiment or all of the embodiments, if more than one embodiment is described herein.

Another feature or aspect of an embodiment is believed at the time of the filing of this patent application to possibly reside broadly in the combination tool, wherein a groove or recessed portion oriented in axial direction 29 is provided on the base body 2 as a cassette adaptor or insert holder adaptor 12 for the cassette or insert holder 14, 60.

Yet another feature or aspect of an embodiment is believed at the time of the filing of this patent application to possibly reside broadly in the combination tool, wherein the cassette or insert holder 14, 60 is adjustable, in mounted condition, in axial direction 29 with the help of a first adjusting element 40 clamped between the cassette or insert holder 14, 60 and the base body 2.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Still another feature or aspect of an embodiment is believed at the time of the filing of this patent application to possibly reside broadly in the combination tool, wherein the first adjusting element is designed as a clamping wedge 40 which is displaceable with the help of a setting element 52 in direction of the longitudinal axis 54 of the setting element 52.

All of the patents, patent applications and publications recited herein, and in the Declaration attached hereto, are hereby incorporated by reference as if set forth in their entirety herein.

The purpose of incorporating U.S. patents, Foreign patents, publications, etc. is solely to provide additional information relating to features of one or more embodiments, which information may not be completely disclosed in the wording in the pages of this application.

The purpose of incorporating the foreign equivalent patent application no. PCT/EP2007/000857 is solely for the purpose of providing a basis of correction of any wording in the pages of the present application, which may have been mistranslated or misinterpreted by the translator.

Statements made in the original foreign patent application no. PCT/EP2007/000857 from which this patent application claims priority which do not have to do with the correction of the translation in this patent application are not to be included in this patent application in the incorporation by reference.

A further feature or aspect of an embodiment is believed at the time of the filing of this patent application to possibly reside broadly in the combination tool, wherein the cassette or insert holder 14, 60 is adjustable, in mounted condition, in radial direction 31 with the help of a second adjusting element 42.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Another feature or aspect of an embodiment is believed at the time of the filing of this patent application to possibly reside broadly in the combination tool, wherein the second adjusting element 42 is designed as an adjusting screw which can be screwed into a thread of the cassette or insert holder 14, 60 and is supported by the base body 2.

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

Yet another feature or aspect of an embodiment is believed at the time of the filing of this patent application to possibly reside broadly in the combination tool having a plate-shaped cutting insert 20 including an insert base body 68 comprising two base sides 22 which are situated opposite each other and connected with each other through small sides 32, a coating structure comprising two layers 64, 66 for forming a cutting edge 72 between the small side 32 and the base side 22 being applied on a small side 32 of the insert base body 68.

Still another feature or aspect of an embodiment is believed at the time of the filing of this patent application to possibly reside broadly in the combination tool, wherein two small sides 32 virtually adjacent to each other are provided with the coating structure, the layers 64, 66 meeting in an abutting edge in a mitered manner.

A further feature or aspect of an embodiment is believed at the time of the filing of this patent application to possibly reside broadly in the combination tool having a plate-shaped cutting insert 20 including an insert base body 68 comprising two base sides 22 which are situated opposite each other and connected with each other through small sides 32, a plate-shaped coating structure comprising two layers 64, 66 for forming a cutting edge 72 between the small side 32 and the base side 22 being applied on a base side 22 of the insert base body 68.

All of the patents, patent applications or patent publications, which were cited in the international search report dated Nov. 19, 2007, and/or cited elsewhere are hereby incorporated by reference as if set forth in their entirety herein as follows: JP 11 277314 A, EP 0 890 402 A, EP 1 415 743, EP 0 714 719, DE 41 00 351 A1, WO 2004/103617 A, WO 2005/000519 A, GB 2 254 027 A, EP 0 019 461 A, EP 0 449 547 A, WO 2005/118188 A, JP 10 193203 A, WO 98/07543 A, WO 2005/097383 A, DE 22 35 782 A1, U.S. Pat. No. 3,371,394 A, WO 94/21411 A, WO 2005/102574 A, DE 39 24 884 A1, WO 94/26448 A, DE 102 34 346 A1, U.S. Pat. No. 2,946,245 A, EP 1 123 766 A1, FR 2 668 968 A, and JP 2007 069268 A.

The corresponding foreign and international patent publication applications, namely, Federal Republic of Germany Patent Application No. 10 2006 005 379.6, filed on Feb. 3, 2006, having inventors Thomas Christian LEHMANN and Günter Alfred EBERT, and DE-OS 10 2006 005 379.6 and DE-PS 10 2006 005 379.6, and International Application No. PCT/EP2007/000857, filed on Feb. 1, 2007, having WIPO Publication No. WO 2007/090558 A2 and inventors Thomas Christian LEHMANN and Günter Alfred EBERT, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Another feature or aspect of an embodiment is believed at the time of the filing of this patent application to possibly reside broadly in a method for metal-cutting machining of a drill-hole and its hole surface in one operation, such as, in at least one possible embodiment, for metal-cutting machining of a valve stem bushing and its valve seat 26 with the help of the combination tool.

Yet another feature or aspect of an embodiment is believed at the time of the filing of this patent application to possibly reside broadly in a plate-shaped cutting insert 20 having an insert base body 68 comprising two base sides 22 which are situated opposite each other and connected with each other through small sides 32, the small sides 32 of the insert base body 68 being formed of a coating structure comprising two layers 64, 66, formed on the periphery of the base sides 22, cutting edges 72 being formed between the small sides 32 and one of the base sides 22.

Still another feature or aspect of an embodiment is believed at the time of the filing of this patent application to possibly reside broadly in a plate-shaped cutting insert 20 having an insert base body 68 comprising two base sides 22 which are situated opposite each other and connected with each other through small sides 32, a plate-shaped coating structure comprising two layers 64, 66 being applied on one base side 22 of the insert base body 68 for forming a cutting edge 72 between the small side 32 and the base side 22, a front face of the two layers 64, 66, oriented to the respective small side 32 being oriented at a clearance angle γ to an insert vertical, and the layers 64, 66 being essentially adjacent, without steps, to the insert base body on the small side 32.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The combination tool serves in particular for intermediate machining and finishing of the valve seat as well as of the valve stem bushing in particular of a motor-vehicle cylinder head. Combination tools for such machining operations are described, for example, in WO 03/013771 or German Patent No. 196 54 346 A1.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the description of the embodiment or embodiments, the summary, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of finishing an internal combustion engine part having several valve seat structures and valve stem structures using a plurality of combination tools connected to a machine tool, each combination tool of said plurality of combination tools comprising a tool body; said tool body being connected to and disposed to extend from said machine tool; said tool body comprising: a rotational axis; a central portion being disposed immediately about the rotational axis of said tool body; a reamer, comprising a shank portion and a cutting portion; at least a portion of said shank portion being disposed in and held by said central portion; said reamer being configured to be rotated by said tool body to finish a valve stem structure in a part; a plurality of inserts being disposed on said tool body adjacent to said reamer and being configured to finish a valve seat in a part of an internal combustion engine; said plurality of inserts being radially spaced about and from said rotational axis; a plurality of fastening structures; said plurality of fastening structures comprising a first fastening structure; said plurality of fastening structures being essentially operationally identical to said first fastening structure; said plurality of inserts comprising a first insert; said first fastening structure being configured and disposed to fasten said first insert to said tool body; said plurality of inserts being essentially operationally identical to said first insert; said first insert comprising: a first surface comprising: a fastening hole being disposed substantially in the middle of and substantially perpendicular to said first surface; said fastening hole having a central axis which central axis at least substantially intersects said rotational axis of said tool body; a plurality of peripheral edges, said plurality of peripheral edges comprising a first, cutting edge and at least a second edge; and a center disposed substantially equally from all said edges; a second surface being disposed opposite said first surface; said second surface comprising a plurality of peripheral edges; a plurality of side surfaces extending from said peripheral edges of said first surface to said peripheral edges of said second surface; said plurality of side surfaces comprising: a first, cutting, side surface extending from said first, cutting edge; and a portion of a second, side surface disposed away from said first, cutting, side surface and extending from said second edge; each of said first surface and said second surface having a greater area than a surface area of any one of said side surfaces; said first surface of said first insert being disposed away from said second surface by a first distance; said first, cutting, side surface being disposed away from said portion of said second, side surface by a second distance; said second distance being substantially greater than said first distance; said plurality of inserts being fastened by said plurality of fastening structures to said tool body, such that said second surface is disposed to face toward said central portion of said tool body and also is in contact with said tool body; said first surface of said first insert is disposed to face away from said central portion of said tool body; said second surface and said cutting surface being configured and disposed to together form a third edge disposed opposite said first, cutting edge; said third edge of said first insert being disposed closer to said tool body than said first, cutting edge; said cutting edge of said first insert being configured to be disposed at an angle substantially parallel to an angle of at least a portion of the valve seat to be cut; and said first distance being sufficiently short, upon said plurality of inserts being fastened by said tool body using said plurality of fastening structures, to minimize vibrations of said first insert and also sufficiently short to permit absorption of vibrations generated by said first insert by said tool body; a straight line, which is at least generally perpendicular to said first surface of said first cutting insert, is configured to extend through sad central portion of said combination tool upon assembly of said first cutting inserts in said combination tool:

said tool body comprising a first abutment against which said second side surface of said first insert rests during operation; and a substantially flat surface against which said second surface abuts during operation; said first fastening structure holding said second surface of said first insert against said substantially flat surface of said tool body, thereby permitting the distance between said tool bodies in said plurality of combination tools being disposed at a minimal distance between one another;

said method comprising the steps of:

disposing said second surface of said first insert against said substantially flat surface of said tool body;

disposing said second side surface against said first abutment;

thereby disposing said first surface of said first insert a minimal distance from said rotational axis and disposing said cutting edge a minimal distance from said rotational axis to minimize vibrations of said first insert and to absorb vibrations generated by said first insert;

fastening said plurality of inserts to said tool body with said plurality of fastening structures;

turning on said combination tools;

rotating said combination tools;

advancing said combination tools into the preformed holes;

finishing a plurality of valve stem structures with said reamers while substantially simultaneously finishing a plurality of valve seat structures with said plurality of inserts; and removing said combination tools from the finished holes.

2. The method according to claim 1, wherein:

said fastening structure is configured to press against at least one portion of said first surface and hold at least one portion of said second surface of at least one insert against said tool body;

said at least one insert comprises a hole extending from said first surface to said second surface; and said fastening structure comprises a screw extending through said hole to fasten said at least one insert to said tool body;

said tool body also comprises a clamping chuck;

said clamping chuck being configured to extend in an axial direction and to hold said shank of said reamer;

said clamping chuck is configured to exert a clamping force which acts peripherally and uniformly;

said tool body comprises a clamping structure fastened laterally on said clamping chuck and configured to adjust said clamping chuck;

said clamping chuck comprises an axial adjusting mechanism for adjusting said reamer in said axial direction, and said adjusting mechanism is actuatable by an adjusting element fastened laterally on said clamping chuck;

said tool body also comprises at least one exchangeable insert holder;

said exchangeable insert holder comprises an insert holder base body extending in said axial direction;

said exchangeable insert holder comprises a front end face on which said cutting insert is fastened;

said exchangeable insert holder comprises a first adjusting apparatus for adjusting said exchangeable insert holder in said axial direction, in which:

said first adjusting apparatus is configured to be clamped between said exchangeable insert holder and said tool body;

said first adjusting apparatus comprises a clamping wedge, in which said clamping wedge is displaceable in the direction of a longitudinal axis; and said first adjusting apparatus comprises a first setting element;

said exchangeable insert holder comprises a second setting element configured for adjusting said exchangeable insert holder in a radial direction, in which said second setting element is designed as an adjusting screw which is screwed into a thread of said insert holder and is supported by said base body;

said front end face of said exchangeable insert holder is disposed at a cone angle in respect to the rotational axis, said cone angle being in the range of 80 degrees and 200 degrees;

said tool body comprises a recessed portion, oriented in said axial direction, said recessed portion being configured and disposed to receive said exchangeable insert holder;

said at least one insert comprises a plurality of inserts disposed about said tool body;

said combination tool uses an insert comprising a plate-shaped coating structure comprising two layers for forming a cutting edge between said first surface and at least one said side surface;

said clamping chuck is a hydraulic clamping chuck, said hydraulic clamping chuck comprising a pressure space in the manner of an annular gap for generating the clamping force; and said combination tool is configured and disposed to be placed in a group with other combination tools in such a way that said group of combination tools work substantially simultaneously in one machining process.

3. A combination tool being configured to cut and finish a valve stem structure and substantially simultaneously a valve seat in a part of an internal combustion engine, said tool comprising:

a tool body having a rotational axis;

said tool body comprising a central portion being disposed immediately about the rotational axis of said tool body;

a reamer comprising a shank portion and a cutting portion;

at least a portion of said shank portion being disposed in and held by said central portion;

said reamer being configured to be rotated by said tool body to finish a valve stem structure in a part of an internal combustion engine;

at least one insert being disposed on said tool body adjacent to said reamer and being configured to finish a valve seat in a part of an internal combustion engine;

said inserts being radially spaced about and from said rotational axis;

a fastening structure being configured and disposed to fasten said at least one insert to said tool body;

said at least one insert comprising a first insert:

said first insert comprising:

a first surface comprising:

a fastening hole being disposed substantially in the middle of and substantially perpendicular to said first surface;

said fastening hold having a central axis which central axis at least substantially intersects said rotational axis of said tool body;

a plurality of peripheral edges, said plurality of peripheral edges comprising a first, cutting edge and a second edge opposite said first, cutting edge; and a center disposed substantially equally from all said edges;

a second surface being disposed opposite said first surface;

said second surface comprising a plurality of peripheral edges;

a plurality of side surfaces extending from said peripheral edges of said first surface to said peripheral edges of said second surface;

said plurality of side surfaces comprising:

a first, cutting, side surface extending from said first, cutting edge; and a second, side surface disposed opposite said first, cutting, side surface and extending from said second edge;

each of said first surface and said second surface having a greater area than a surface area of any one of said side surfaces;

a line perpendicular to a plane, in which said plurality of peripheral edges at least substantially lie, which perpendicular line passes through said center of said first surface of said insert also passes through said central portion of said tool;

a straight line, which is at least generally perpendicular to said first surface of said first insert, is configured to extend through said central portion of said combination tool upon assembly of said cutting insert in said combination tool;

said first surface of said first insert being disposed away from said second surface by a first distance;

said first, cutting, side surface being disposed away from said second, side surface by a second distance;

said second distance being substantially greater than said first distance;

said at least one insert being fastened by said fastening structure to said tool body, such that said second surface is disposed to face toward said central portion of said tool body and also is in contact with said tool body;

said first surface of said insert is disposed to face away from said central portion of said tool body;

said second surface and said cutting surface being configured and disposed to together form a third edge disposed opposite said first, cutting edge;

said third edge of said insert being disposed closer to said tool body than said first, cutting edge;

said cutting edge of said first insert being configured to be disposed at an angle substantially parallel to an angle of at least a portion of the valve seat to be cut; and said first distance being sufficiently short, upon said first insert being fastened to said tool body using said fastening structure, to minimize vibrations of said first insert and also sufficiently short to permit absorption of vibrations generated by said tool body.

4. The combination tool according to claim 3, said combination tool further comprising one of (i), (ii), (iii), and (iv), wherein:

(i) said fastening structure is configured to press against at least one portion of said first surface and hold at least one portion of said second surface of at least one insert against said tool body;

said at least one insert comprises a hole extending from said first surface to said second surface; and said fastening structure comprises a screw extending through said hole to fasten said at least one insert to said tool body;

said tool body also comprises a clamping chuck;

said clamping chuck being configured to extend in an axial direction and to hold said shank of said reamer;

said clamping chuck being configured to exert a clamping force which acts peripherally and uniformly;

said tool body comprises a clamping structure being fastened laterally on said clamping chuck and being configured to adjust said clamping chuck;

said clamping chuck comprises an axial adjusting mechanism for adjusting said reamer in said axial direction, and said adjusting mechanism being actuatable by an adjusting element fastened laterally on said clamping chuck;

said tool body also comprises at least one exchangeable insert holder;

said exchangeable insert holder comprises an insert holder base body extending in said axial direction;

said exchangeable insert holder comprises a front end face on which said cutting insert is fastened;

said exchangeable insert holder comprises a first adjusting apparatus for adjusting said exchangeable insert holder in said axial direction;

(ii) said fastening structure is configured to press against at least one portion of said first surface and hold at least one portion of said second surface of at least one insert against said tool body;

said at least one insert comprises a hole extending from said first surface to said second surface; and said fastening structure comprises a screw extending through said hole to fasten said at least one insert to said tool body;

said tool body also comprises a clamping chuck;

said clamping chuck being configured to extend in an axial direction and to hold said shank of said reamer;

said clamping chuck being configured to exert a clamping force which acts peripherally and uniformly;

said tool body comprises a clamping structure being fastened laterally on said clamping chuck and being configured to adjust said clamping chuck;

said clamping chuck comprises an axial adjusting mechanism for adjusting said reamer in said axial direction, and said adjusting mechanism being actuatable by an adjusting element fastened laterally on said clamping chuck;

said tool body also comprises at least one exchangeable insert holder;

said exchangeable insert holder comprises an insert holder base body extending in said axial direction;

said exchangeable insert holder comprises a front end face on which said cutting insert is fastened;

said exchangeable insert holder comprises a first adjusting apparatus for adjusting said exchangeable insert holder in said axial direction, in which:

said first adjusting apparatus is configured to be clamped between said exchangeable insert holder and said tool body;

said first adjusting apparatus comprises a clamping wedge, in which said clamping wedge is displaceable in the direction of a longitudinal axis; and said first adjusting apparatus comprises a first setting element;

said exchangeable insert holder comprises a second setting element configured to adjust said exchangeable insert holder in a radial direction, in which said second setting element is designed as an adjusting screw which is screwed into a thread of said insert holder and is supported by said base body;

(iii) said fastening structure is configured to press against at least one portion of said first surface and hold at least one portion of said second surface of at least one insert against said tool body;

said at least one insert comprises a hole extending from said first surface to said second surface; and said fastening structure comprises a screw extending through said hole to fasten said at least one insert to said tool body;

said tool body also comprises a clamping chuck;

said clamping chuck being configured to extend in an axial direction and to hold said shank of said reamer;

said clamping chuck being configured to exert a clamping force which acts peripherally and uniformly;

said tool body comprises a clamping structure being fastened laterally on said clamping chuck and being configured to adjust said clamping chuck;

said clamping chuck comprises an axial adjusting mechanism for adjusting said reamer in said axial direction, and said adjusting mechanism being actuatable by an adjusting element fastened laterally on said clamping chuck;
said tool body also comprises at least one exchangeable insert holder;
said exchangeable insert holder comprises an insert holder base body extending in said axial direction;
said exchangeable insert holder comprises a front end face on which said cutting insert is fastened;
said exchangeable insert holder comprises a first adjusting apparatus for adjusting said exchangeable insert holder in said axial direction, in which:
  said first adjusting apparatus is configured to be clamped between said exchangeable insert holder and said tool body;
  said first adjusting apparatus comprises a clamping wedge, in which said clamping wedge is displaceable in the direction of a longitudinal axis; and
  said first adjusting apparatus comprises a first setting element;
said exchangeable insert holder comprises a second setting element configured to adjust said exchangeable insert holder in a radial direction, in which said second setting element is designed as an adjusting screw which is screwed into a thread of said insert holder and is supported by said base body;
said front end face of said exchangeable insert holder is disposed at a cone angle in respect to the rotational axis, said cone angle being in the range of 80 degrees and 200 degrees;
said tool body comprises a recessed portion, oriented in said axial direction, said recessed portion being configured and disposed to receive said exchangeable insert holder; and
(iv) said fastening structure is configured to press against at least one portion of said first surface and hold at least one portion of said second surface of at least one insert against said tool body;
said at least one insert comprises a hole extending from said first surface to said second surface; and said fastening structure comprises a screw extending through said hole to fasten said at least one insert to said tool body;
said tool body also comprises a clamping chuck;
said clamping chuck being configured to extend in an axial direction and to hold said shank of said reamer;
said clamping chuck being configured to exert a clamping force which acts peripherally and uniformly;
said tool body comprises a clamping structure being fastened laterally on said clamping chuck and being configured to adjust said clamping chuck;
said clamping chuck comprises an axial adjusting mechanism for adjusting said reamer in said axial direction, and said adjusting mechanism being actuatable by an adjusting element fastened laterally on said clamping chuck;
said tool body also comprises at least one exchangeable insert holder;
said exchangeable insert holder comprises an insert holder base body extending in said axial direction;
said exchangeable insert holder comprises a front end face on which said cutting insert is fastened;
said exchangeable insert holder comprises a first adjusting apparatus for adjusting said exchangeable insert holder in said axial direction, in which:
  said first adjusting apparatus is configured to be clamped between said exchangeable insert holder and said tool body;
  said first adjusting apparatus comprises a clamping wedge, in which said clamping wedge is displaceable in the direction of a longitudinal axis; and
  said first adjusting apparatus comprises a first setting element;
said exchangeable insert holder comprises a second setting element configured to adjust said exchangeable insert holder in a radial direction, in which said second setting element is designed as an adjusting screw which is screwed into a thread of said insert holder and is supported by said base body;
said front end face of said exchangeable insert holder is disposed at a cone angle in respect to the rotational axis, said cone angle being in the range of 80 degrees and 200 degrees;
said tool body comprises a recessed portion, oriented in said axial direction, said recessed portion being configured and disposed to receive said exchangeable insert holder;
said at least one insert comprises a plurality of inserts disposed about said tool body;
said combination tool uses an insert comprising a plate-shaped coating structure comprising two layers for forming a cutting edge between said first surface and at least one said side surface;
said clamping chuck is a hydraulic clamping chuck, said hydraulic clamping chuck comprising a pressure space in the manner of an annular gap for generating the clamping force; and
said combination tool is configured and disposed to be placed in a group with other combination tools in such a way that said group of combination tools work substantially simultaneously in one machining process.

5. A combination tool being configured to cut and finish a valve stem structure and substantially simultaneously a valve seat in a part, said tool comprising:
a tool body having a rotational axis;
said tool body comprising a central portion being disposed immediately about the rotational axis of said tool body;
a reamer, comprising a shank portion and a cutting portion;
at least a portion of said shank portion being disposed in and held by said central portion;
said reamer being configured to be rotated by said tool body to finish a valve stem structure in a part;
at least one insert being disposed on said tool body adjacent to said reamer and being configured to finish a valve seat in a part of an internal combustion engine;
said inserts being radially spaced around said rotational axis;
a fastening structure being configured and disposed to fasten said at least one insert to said tool body;
said at least one insert comprising a first insert;
said first insert comprising:
  a first surface comprising:
    a plurality of peripheral edges, said plurality of peripheral edges comprising a first, cutting edge and at least a second edge;
    a center disposed substantially equally from all said edges of said first surface; and
    a fastening hole being disposed substantially in the middle of and substantially perpendicular to said first surface;
    said fastening hole having a central axis which central axis at least substantially intersects said rotational axis of said tool body;
  a second surface being disposed opposite said first surface;

said second surface comprising a plurality of peripheral edges;

a plurality of side surfaces extending from said peripheral edges of said first surface to said peripheral edges of said second surface;

said plurality of side surfaces comprising:

a first, cutting, side surface extending from said first, cutting edge; and a first portion of a second, side surface disposed farthest away from said first, cutting, side surface; said first portion of a second, side surface extending from said second edge;

each of said first surface and said second surface having a greater area than a surface area of any one of said side surfaces;

said first surface of said first insert being disposed away from said second surface by a first distance;

said first, cutting, side surface being disposed away from said portion of said second, side surface by a second distance;

said second distance being substantially greater than said first distance;

said at least one insert being fastened by said fastening structure to said tool body, such that said second surface is disposed to face toward said central portion of said tool body and also is in contact with said tool body;

said first surface of said insert is disposed to face away from said central portion of said tool body;

said second surface and said cutting surface being configured and disposed to together form a third edge disposed opposite said first, cutting edge;

said third edge of said insert being disposed closer to said tool body than said first, cutting edge;

a straight line, which is at least generally perpendicular to said first surface of said first insert, extends through said central portion of said tool body upon assembly of said cutting insert in said combination tool; and said first distance being sufficiently short, upon said first insert being fastened to said tool body using said fastening structure, to minimize vibrations of said first insert and also sufficiently short to permit absorption of vibrations by said tool body generated by said first insert.

6. The combination tool according to claim 5, wherein said fastening structure is configured to press against at least one portion of said first surface and hold at least one portion of said second surface of at least one insert against said tool body; and said first surface lying substantially tangentially to a circle having a radius from said rotational axis to said first surface.

7. The combination tool according to claim 6, wherein said fastening hole extends from said first surface to said second surface; and said fastening structure comprises a screw extending through said fastening hole to fasten said at least one insert to said tool body.

8. The combination tool according to claim 7, wherein:

said tool body also comprises a clamping chuck;

said clamping chuck being configured to extend in the direction of said rotational axis and to hold said shank of said reamer;

said clamping chuck being configured to exert a clamping force which acts peripherally and uniformly;

said tool body comprises a clamping structure being fastened laterally on said clamping chuck and being configured to adjust said clamping chuck; and said clamping chuck comprises an axial adjusting mechanism for adjusting said reamer in the direction of said rotational axis, and said adjusting mechanism being actuatable by an adjusting element fastened laterally on said clamping chuck.

9. The combination tool according to claim 8, wherein:

said tool body also comprises at least one exchangeable insert holder;

said exchangeable insert holder comprises an insert holder base body extending in the direction of said rotational axis;

said exchangeable insert holder comprises a front end face on which said cutting insert is fastened;

said exchangeable insert holder comprises a first adjusting apparatus for adjusting said exchangeable insert holder in the direction of said rotational axis, in which:

said first adjusting apparatus is configured to be clamped between said exchangeable insert holder and said tool body;

said first adjusting apparatus comprises a clamping wedge, in which said clamping wedge is displaceable in the direction of the rotational axis; and said first adjusting apparatus comprises a first setting element;

said exchangeable insert holder comprises a second setting element configured to adjust said exchangeable insert holder in a radial direction, in which said second setting element is designed as an adjusting screw which is screwed into a thread of said insert holder and is supported by said base body; and said front end face of said exchangeable insert holder is disposed at a cone angle in respect to the rotational axis, said cone angle being in the range of 80 degrees and 200 degrees.

10. The combination tool according to claim 9, wherein said tool body comprises a recessed portion, oriented in the direction of said rotational axis, said recessed portion being configured and disposed to receive said exchangeable insert holder.

11. The combination tool according to claim 10, wherein said at least one insert comprises a plurality of inserts disposed about said tool body.

12. The combination tool according to claim 11, wherein said combination tool uses an insert comprising a plate-shaped coating structure comprising two layers for forming a cutting edge between said first surface and at least one said side surface.

13. The combination tool according to claim 12, wherein said clamping chuck is a hydraulic clamping chuck, said hydraulic clamping chuck comprising a pressure space in the manner of an annular gap for generating the clamping force.

14. The combination tool in combination with other combination tools according to claim 13, wherein said combination tool is configured and disposed to be placed in a group with other combination tools in such a way that said group of combination tools work substantially simultaneously in one machining process.

15. An internal combustion engine valve seat cutting insert configured to be mounted on a combination tool being configured to cut and finish a valve stem structure and substantially simultaneously form a valve seat in a part of an internal combustion engine; said internal combustion engine valve seat cutting insert comprising:

a cutting insert body;

a first large surface comprising:

a plurality of peripheral edges, said plurality of peripheral edges comprising a first, cutting, edge and a second edge opposite said first, cutting, edge; and a center disposed substantially equally from all said edges;

a second large surface being disposed opposite said first large surface;

said second large surface comprising a plurality of peripheral edges;

a plurality of side surfaces extending from said peripheral edges of said first large surface to said peripheral edges of said second large surface;

said plurality of side surfaces comprising:
- a first, cutting, side surface extending from said first, cutting, edge; and
- a second, side surface disposed opposite said first, cutting, side surface and extending from said second edge;

each of said first large surface and said second large surface having a greater area than a surface area of any one of said side surfaces;

said first large surface of said engine valve seat cutting insert being disposed away from said second large surface by a first distance;

said first, cutting, side surface being disposed away from said second, side surface by a second distance;

said second distance being substantially greater than said first distance;

said engine valve seat cutting insert being fastenable by a fastening structure to a combination tool, such that said second large surface is disposed to face toward a combination tool and also is in contact with a combination tool;

said first large surface of said engine valve seat cutting insert being configured to face away from a combination tool;

said second large surface and said cutting surface being configured and disposed to together form a third edge disposed opposite said first, cutting, edge;

said third edge of said engine valve seat cutting insert being configured to be disposed closer to a combination tool than said first, cutting, edge;

said first distance being sufficiently short, upon said internal combustion engine valve seat cutting insert being fastened to a combination tool using a fastening structure such that said second large surface faces toward a combination tool, to minimize vibrations of said engine valve seat cutting insert and also sufficiently short to permit absorption of vibrations generated by a combination tool in which said engine valve seat cutting insert is installed;

said first, cutting, edge comprises an outer layer which outer layer forms part of said first large surface and part of said first, cutting, side surface; and an additional layer being disposed between and at least adjacent to both said outer layer and said cutting insert body;

said outer layer comprises a material harder than said additional layer; and a straight line, which is at least generally perpendicular to said first large surface of said internal combustion engine valve seat cutting insert, is configured to extend through a central portion of a combination tool upon assembly of said cutting insert in a combination tool.

16. The internal combustion engine valve seat cutting insert according to claim 15, wherein said additional layer is in contact with said outer layer and said cutting insert body.

17. The internal combustion engine valve seat cutting insert according to claim 16, wherein:
said outer layer comprises at least one of:
cubic boron nitride (CBN); and
diamond; and
said additional layer comprises carbide.

18. The internal combustion engine valve seat cutting insert according to claim 17, wherein said internal combustion engine valve seat cutting insert further comprises one of (A) and (B):

(A) said outer layer comprises a first surface and a second surface;
said first surface of said outer layer forms a part of said first large surface of said internal combustion engine valve seat cutting insert;
said second surface of said outer layer is disposed on said first, cutting, side surface;
said first surface of said outer layer and said second surface of said outer layer form an acute angle with respect to one another as measured through said outer layer to form said first, cutting, edge; and (B) said outer layer comprises a first surface and a second surface;
said first surface of said outer layer forms a part of said first large surface of said internal combustion engine valve seat cutting insert;
said second surface of said outer layer is disposed on said first, cutting, side surface;
said first surface of said outer layer and said second surface of said outer layer form an acute angle with respect to one another as measured through said outer layer to form said first, cutting, edge; and
said acute angle comprises a range between about ten degrees and about fifteen degrees.

19. A cutting insert comprising:
a cutting insert body;
a first large surface;
a plurality of peripheral edges disposed about the periphery of said first large surface thereof;
a second large surface being disposed opposite said first large surface;
a plurality of peripheral edges disposed about the periphery of said second large surface thereof;
a plurality of peripheral side surfaces extending from said plurality of peripheral edges of said first large surface to said plurality of peripheral edges of said second large surface;
at least one cutting edge being configured and disposed at the intersection of said first large surface and at least one of said plurality of peripheral side surfaces;
said plurality of peripheral side surfaces comprising a first side surface;
said at least one cutting edge comprising a first layer and a second layer;
said first layer being disposed on said cutting insert body;
said first layer comprising a first surface and a second surface;
said first surface of said first layer forming part of said first large surface of said cutting insert;
said second surface of said first layer being disposed on said first side surface;
said at least one cutting edge comprising a first cutting edge;
said first surface of said first layer and said second surface of said first layer forming an acute angle with respect to one another as measured through said first layer to form said first cutting edge;
said second layer being disposed between said first layer and said cutting insert body;

said second layer being exposed to said first side surface of said cutting insert; and a straight line, which is at least generally perpendicular to said first large surface of said cutting insert, is configured to extend through a central portion of a combination tool.

20. The cutting insert according to claim 19, said cutting insert further comprising one of (I), (II), (III, (IV), and (V) wherein:

(I) said acute angle comprises a range between about ten degrees and about fifteen degrees;

(II) said acute angle comprises a range between about ten degrees and about fifteen degrees; and said cutting insert comprises further comprises a fastening hole:

disposed substantially in the middle of and substantially perpendicular to said first surface;

having a central axis which central axis is configured to at least substantially intersects a rotational axis of a tool body upon assembly with a combination tool; and extending from said first large surface to said second large surface;

(III) said acute angle comprises a range between about ten degrees and about fifteen degrees;

said cutting insert comprises further comprises a fastening hole:

disposed substantially in the middle of and substantially perpendicular to said first surface;

having a central axis which central axis at least substantially intersects said rotational axis of said tool body; and extending from said first large surface to said second large surface; and said acute angle is a clearance angle;

(IV) said acute angle comprises a range between about ten degrees and about fifteen degrees;

said cutting insert comprises further comprises a fastening hole:

disposed substantially in the middle of and substantially perpendicular to said first surface;

having a central axis which central axis at least substantially intersects said rotational axis of said tool body; and extending from said first large surface to said second large surface;

said acute angle is a clearance angle; and said first layer and said second layer are disposed on said plurality of peripheral side surfaces; and (V) said acute angle comprises a range between about ten degrees and about fifteen degrees;

said cutting insert comprises further comprises a fastening hole:

disposed substantially in the middle of and substantially perpendicular to said first surface;

having a central axis which central axis at least substantially intersects said rotational axis of said tool body; and extending from said first large surface to said second large surface;

said acute angle is a clearance angle;

said first layer and said second layer are disposed on said plurality of peripheral side surfaces; and said second surface of said first layer and said exposed second layer together form a smooth, uninterrupted surface on at least said first side surface.

* * * * *